(12) United States Patent
Christian et al.

(10) Patent No.: US 12,722,813 B2
(45) **Date of Patent: *Sep. 1, 2026**

(54) OFFSET DRAG REDUCTION DEVICE

(71) Applicant: Wing Aviation LLC, Palo Alto, CA (US)

(72) Inventors: Aaron Bryce Christian, Redwood City, CA (US); André Peter Prager, Margraten (NL); Elizabeth Chase Marshman, Brooklyn, NY (US); Christina Lee Ngo, San Jose, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/421,751

(22) Filed: Dec. 16, 2025

(65) Prior Publication Data

US 2026/0103302 A1 Apr. 16, 2026

Related U.S. Application Data

(63) Continuation of application No. 18/778,637, filed on Jul. 19, 2024, now Pat. No. 12,559,267.

(60) Provisional application No. 63/587,996, filed on Oct. 4, 2023.

(51) Int. Cl.

| | |
|---|---|
| ***B64U 101/64*** | (2023.01) |
| ***B64C 7/00*** | (2006.01) |
| ***B64C 21/08*** | (2023.01) |
| ***B64U 30/40*** | (2023.01) |

(52) U.S. Cl.

CPC .............. *B64U 30/40* (2023.01); *B64C 21/08* (2013.01); *B64C 7/00* (2013.01); *B64U 2101/64* (2023.01)

(58) Field of Classification Search

CPC ......... B64C 23/005; B64C 7/00; B64C 25/16; B64U 2101/64

See application file for complete search history.

(56) References Cited

U.S. PATENT DOCUMENTS

| | | | |
|---|---|---|---|
| 6,098,925 | A | 8/2000 | Burdsall, II |
| 2005/0242237 | A1 | 11/2005 | Scott |
| 2010/0012769 | A1 | 1/2010 | Alber |
| 2020/0070992 | A1 | 3/2020 | Theron |

FOREIGN PATENT DOCUMENTS

| | | | |
|---|---|---|---|
| WO | 9323280 | A1 | 11/1993 |

*Primary Examiner* — Timothy D Collins
*Assistant Examiner* — Terri L Filosi
(74) *Attorney, Agent, or Firm* — McDonnell Boehnen Hulbert & Berghoff LLP

(57) ABSTRACT

In one aspect an uncrewed aerial vehicle (UAV) is provided. The uncrewed aerial vehicle includes a fuselage and a drag reduction device. The fuselage has a front end, a rear end, a top, and a bottom. The drag reduction device includes a proximal end and a distal end. The proximal end of the drag reduction device is coupled to the bottom of the fuselage. The drag reduction device is rotatable between a rest position and an active position in which the drag reduction device extends downward. A standoff is disposed on a rear side of the drag reduction device and is configured to engage a payload secured under the fuselage and hold the drag reduction device at a distance from the payload when the drag reduction device is in the active position.

10 Claims, 23 Drawing Sheets

1643
1640
1646

1641
1641
1616
1644

OFFSET DRAG REDUCTION DEVICE

CROSS-REFERENCE TO RELATED APPLICATION

This application is a continuation of U.S. patent application Ser. No. 18/778,637 filed Jul. 19, 2024, which claims priority to U.S. Provisional Patent Application No. 63/587,996 filed Oct. 4, 2023, both of which are incorporated herein by reference in their entirety.

BACKGROUND

An uncrewed vehicle, which may also be referred to as an autonomous vehicle, is a vehicle capable of travel without a physically-present human operator. The term "unmanned" may sometimes be used instead of, or in addition to, "uncrewed," and it should be understood that both terms have the same meaning, and may be used interchangeably. An uncrewed vehicle may operate in a remote-control mode, in an autonomous mode, or in a partially autonomous mode.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter UAVs, among others. Uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

The present embodiments are directed to a UAV with a drag reduction device configured to be positioned in front of an exposed payload to reduce the drag that would otherwise result from the presence of the exposed payload as the UAV flies.

In one aspect an uncrewed aerial vehicle (UAV) is provided. The uncrewed aerial vehicle includes a fuselage and a drag reduction device. The fuselage has a front end, a rear end, a top, and a bottom. The drag reduction device includes a proximal end and a distal end. The proximal end of the drag reduction device is coupled to the bottom of the fuselage. The drag reduction device is rotatable between a rest position and an active position in which the drag reduction device extends downward. A standoff is disposed on a rear side of the drag reduction device and is configured to engage a payload secured under the fuselage and hold the drag reduction device at a distance from the payload when the drag reduction device is in the active position.

In another aspect, a drag reduction system is provided. The drag reduction system includes a bracket configured to mount to a fuselage of an uncrewed aerial vehicle and a drag reduction device. The drag reduction device includes a proximal end attached to the bracket and a distal end. The drag reduction device is rotatable between a rest position and an active position in which the drag reduction device extends substantially downward from the bracket. A standoff is disposed on a rear side of the drag reduction device and is configured to engage a payload when the drag reduction system is mounted to the fuselage, the payload is secured under the fuselage, and the drag reduction device is in the operating position, such that the drag reduction device is spaced from the payload.

In another aspect, a method of transporting a payload using an uncrewed aerial vehicle (UAV) is provided. The method includes securing a payload under a fuselage of the UAV. The method also includes operating the UAV in a lift mode with a drag reduction device that is coupled to the UAV in a rest position such that the drag reduction device extends forward. The method also includes operating the UAV in a forward flight mode with the drag reduction device in an active position and with a standoff that is attached to a rear side of the drag reduction device engaging the payload so as to hold the drag reduction device at a distance from the payload.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
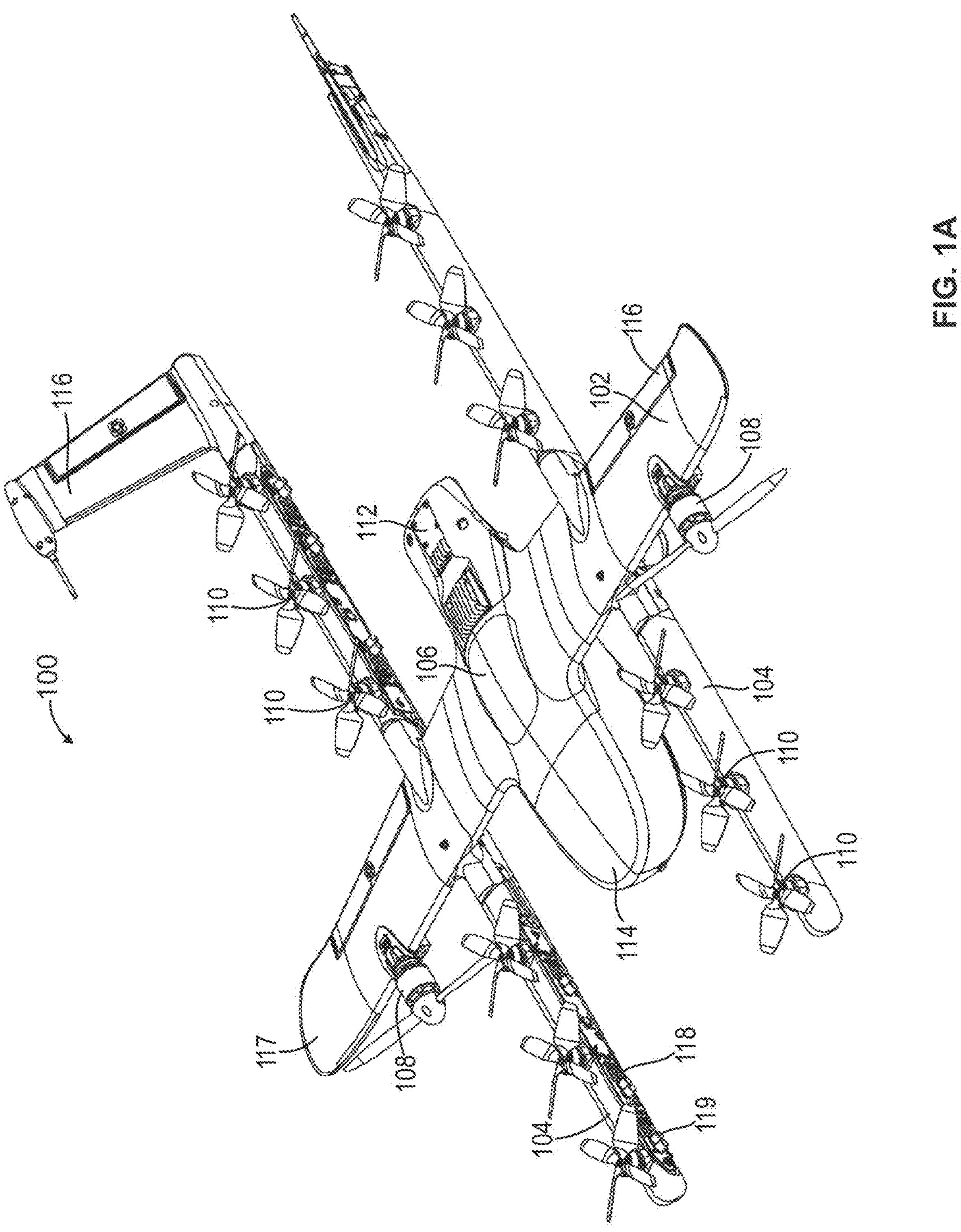
FIG. 1A is a simplified illustration of an uncrewed aerial vehicle, according to an example embodiment.

Exemplary methods and systems are described herein. It should be understood that the word “exemplary” is used herein to mean “serving as an example, instance, or illustration.” Any implementation or feature described herein as “exemplary” or “illustrative” is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments are related to uncrewed aerial vehicles (UAVs) that are used to carry a payload to be delivered or retrieved. As an example, a UAV may be used to deliver or retrieve a payload to or from an individual or business. In operation the payload to be delivered is secured to the UAV and then flown to the desired delivery site. Once the UAV arrives at the delivery site, the UAV may be operated in a hover mode while the payload is dropped or lowered towards the delivery site, or the UAV may land to deliver the payload.

Described herein are various embodiments of a drag reduction device that is adapted for use with an exposed payload that is carried by a UAV, and methods of using the drag reduction device. The drag reduction device is configured to reduce the drag that would otherwise occur as a result of the exposed portion of the payload. The drag reduction device may be positioned in front of the payload with respect to the direction of travel, and is configured such that the drag on the combination of the payload and drag reduction device is less than the drag would be on the payload alone.

Beneficially, the drag reduction device may be smaller and lighter than alternative structures used to reduce drag associated with the payload, such as a fairing or a fuselage that is sufficiently large to hold the payload internally. A standoff may be secured to the drag reduction device and configured to hold the drag reduction device at a distance from the payload to facilitate the reduction in drag.

Further details and other embodiments of drag reduction devices and methods of using a drag reduction device according to the disclosure are described in more detail below.

II. Illustrative Uncrewed Vehicles

Herein, the terms “uncrewed aerial vehicle” and “UAV” refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms “drone,” “uncrewed aerial vehicle system” (UAVS), or “uncrewed aerial system” (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV’s forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
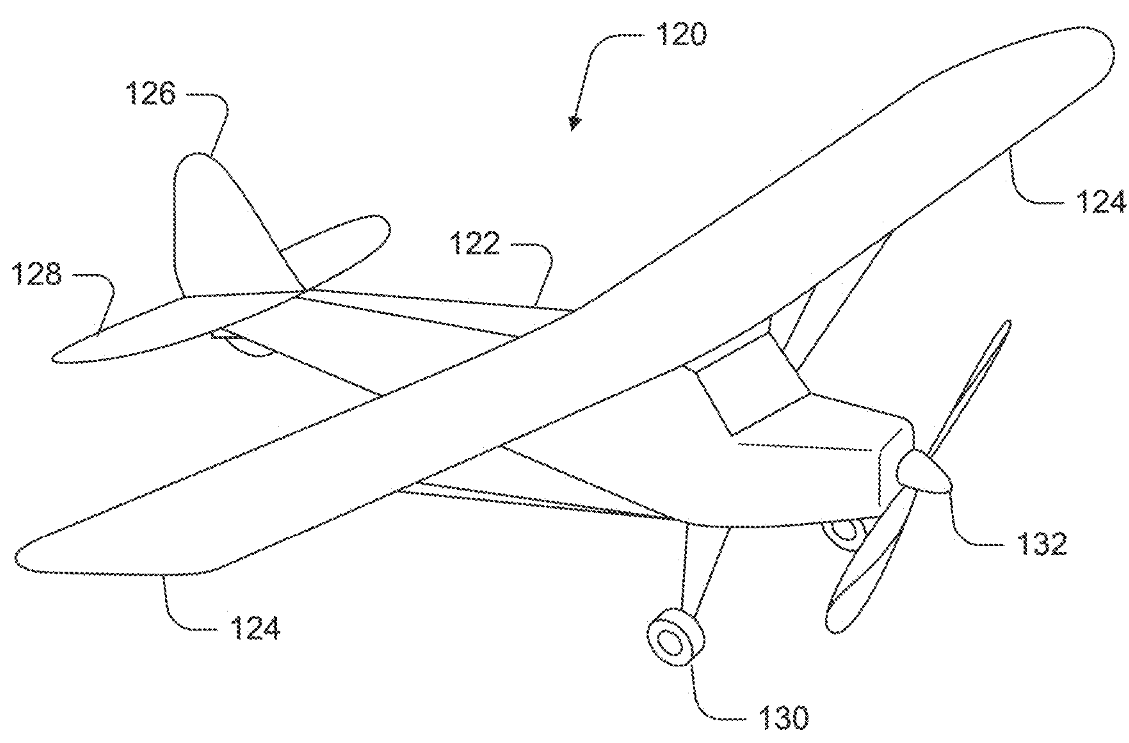
FIG. 1B is a simplified illustration of an uncrewed aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
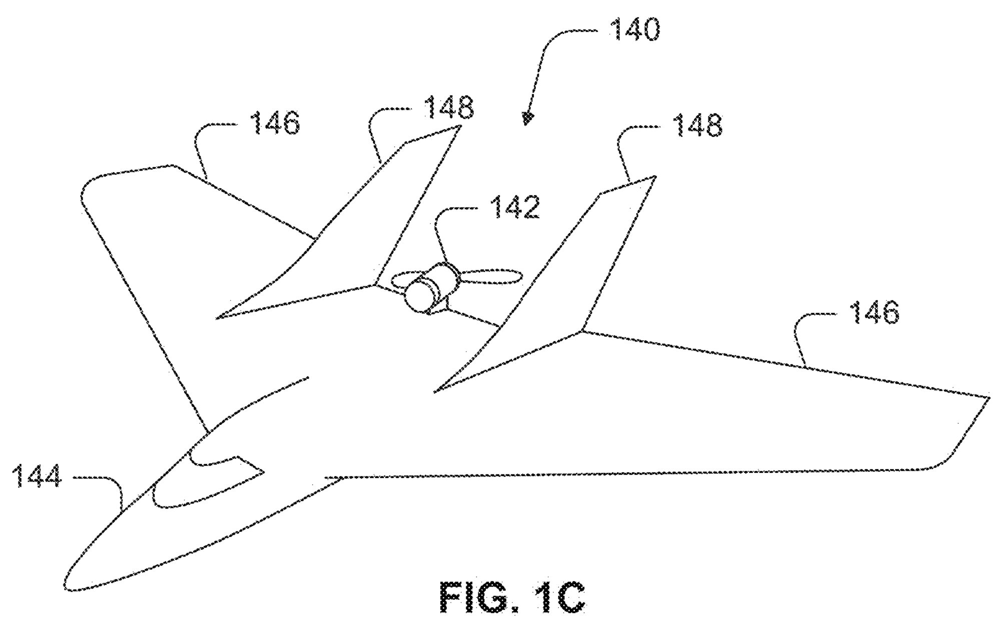
FIG. 1C is a simplified illustration of an uncrewed aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1, FIG. 1C depicts common structures used in a pusher plane, including a fuselage 144, two wings 146, vertical stabilizers 148, and the propulsion unit 142, which can include a motor, shaft, and propeller.

Figure 1D:
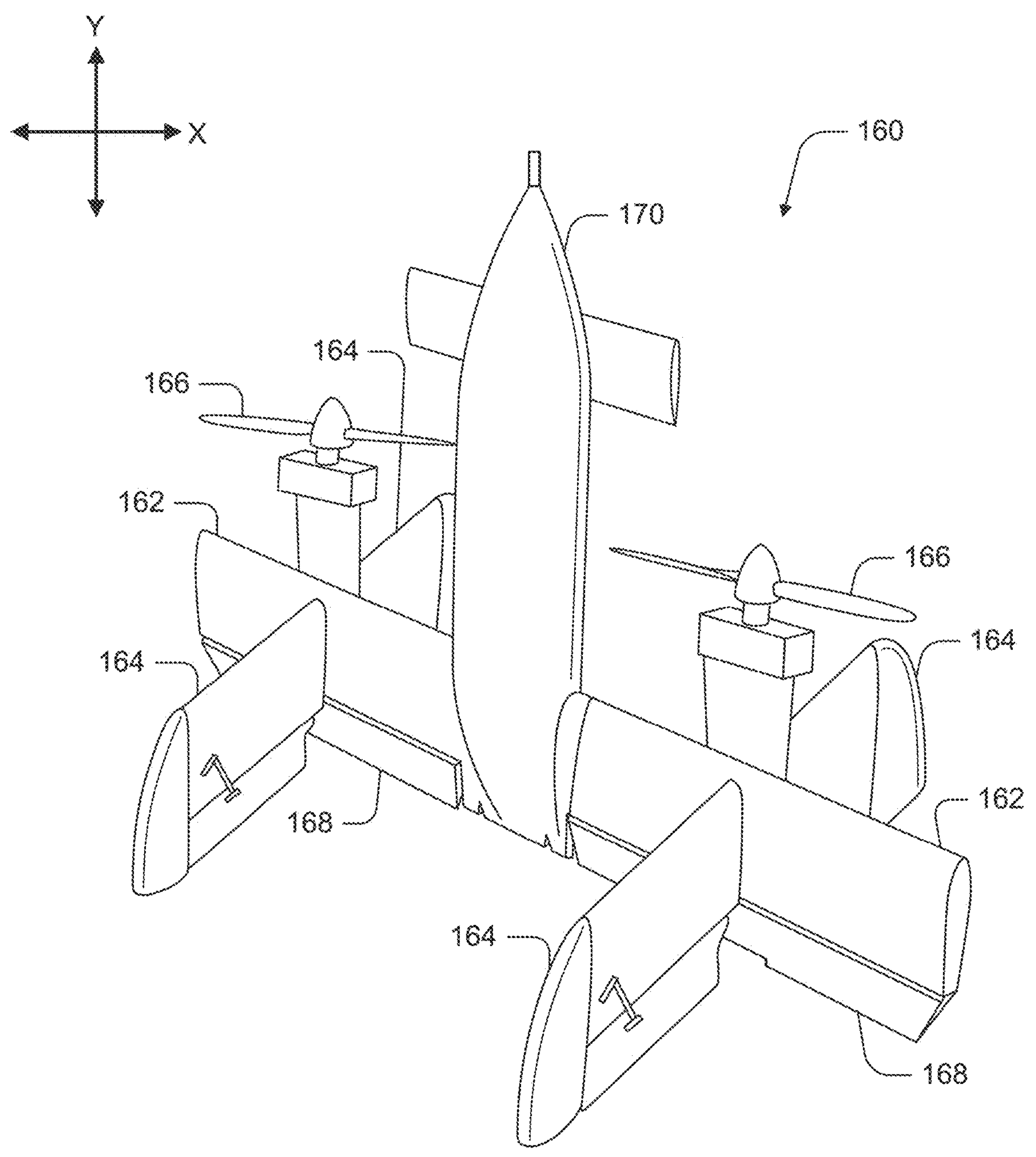
FIG. 1D is a simplified illustration of an uncrewed aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
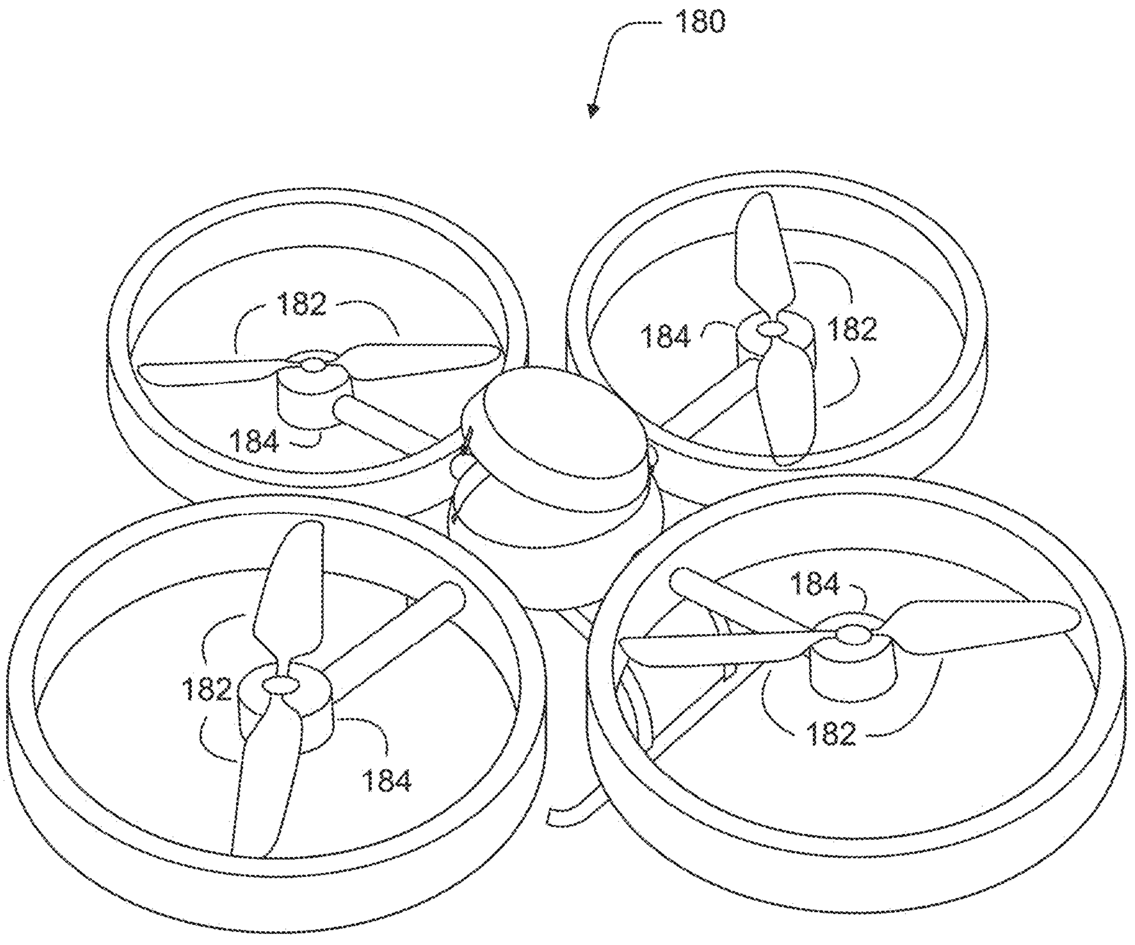
FIG. 1E is a simplified illustration of an uncrewed aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Illustrative UAV Components

Figure 2:
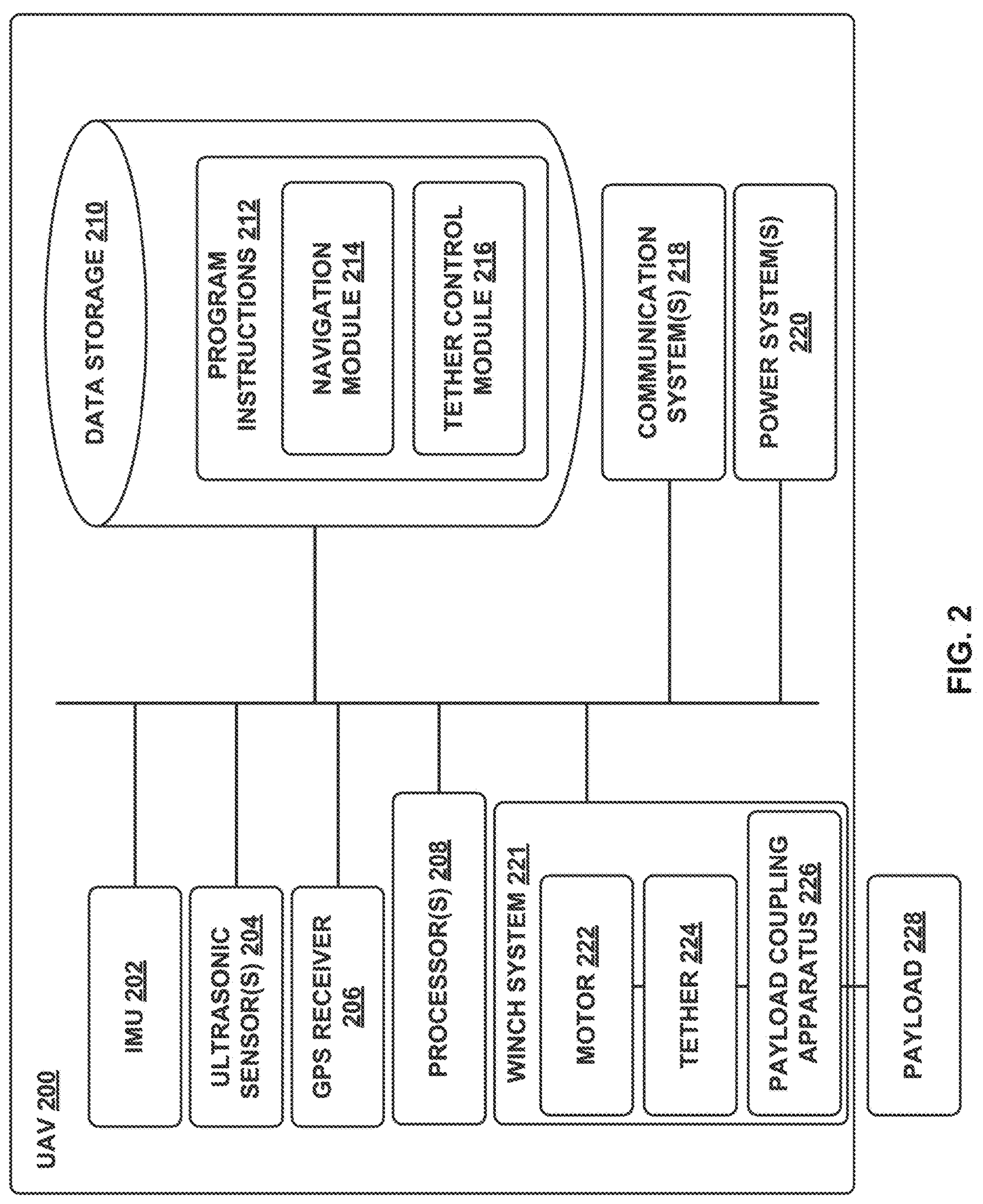
FIG. 2 is a simplified block diagram illustrating components of an uncrewed aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
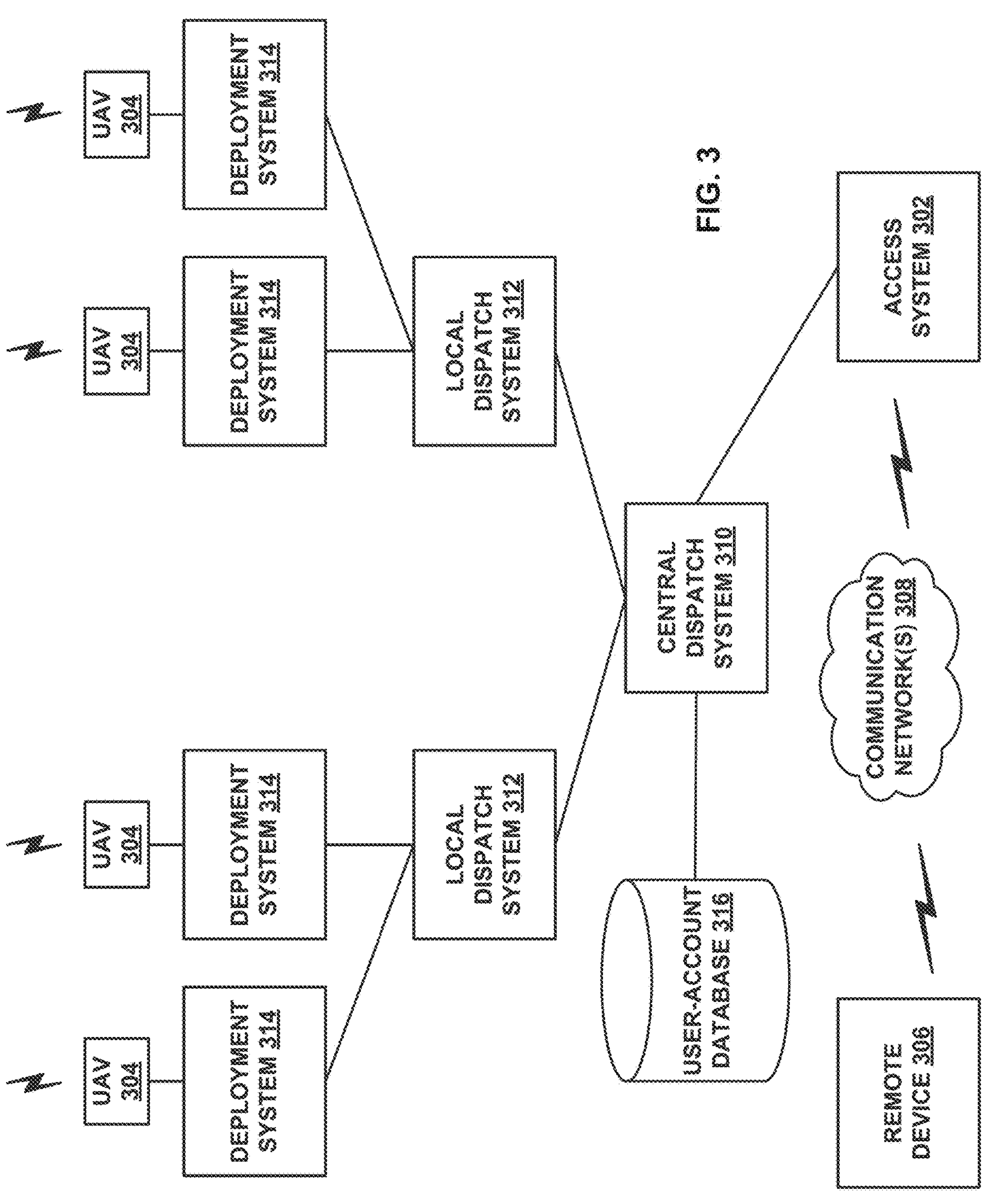
FIG. 3 is a simplified block diagram illustrating a UAV system, according to an example embodiment.
Figures 4A, 4B, 4C:
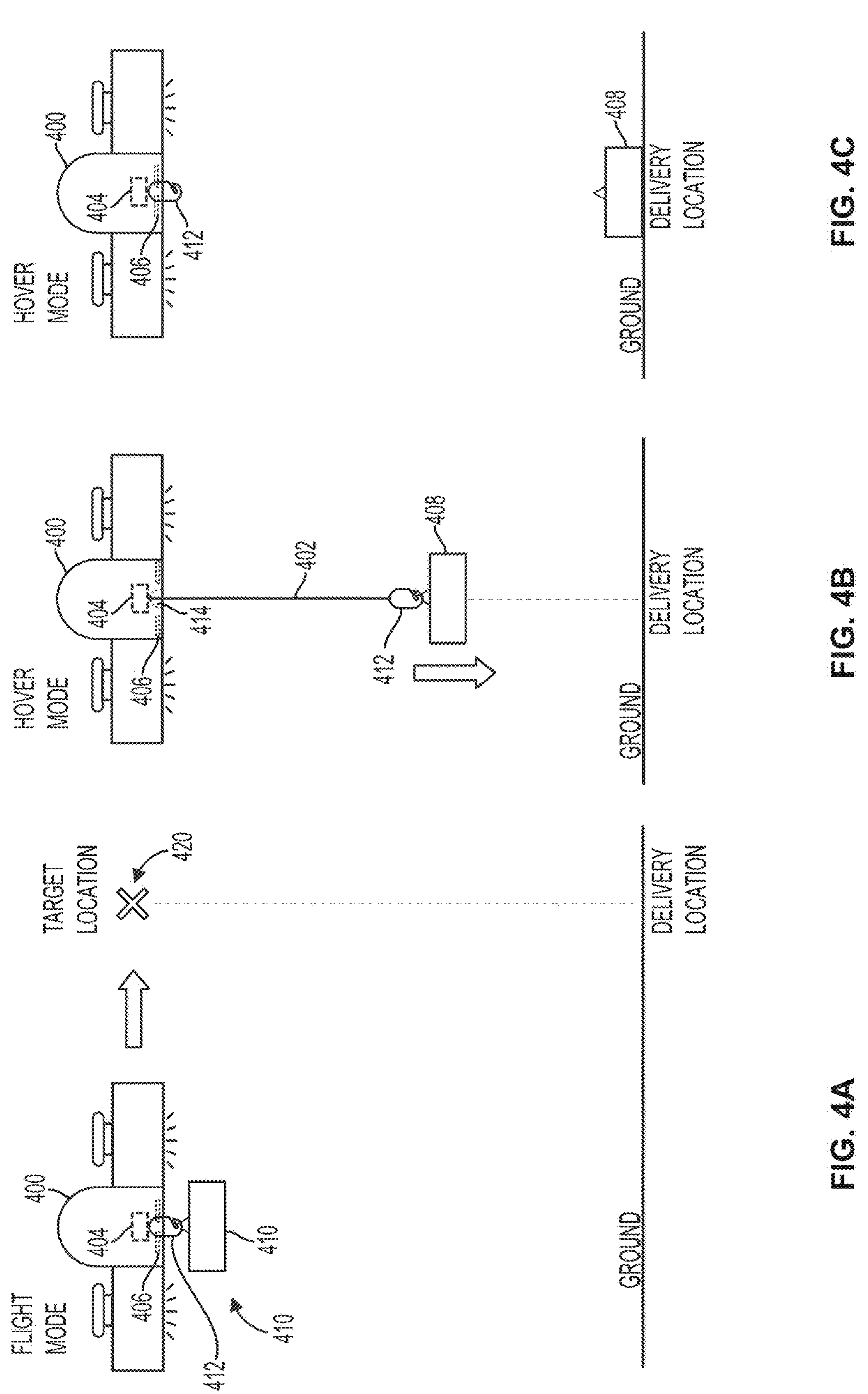
FIGS. 4A, 4B, and 4C show a payload delivery apparatus, according to example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Illustrative Drag Reduction Devices

Figure 5:
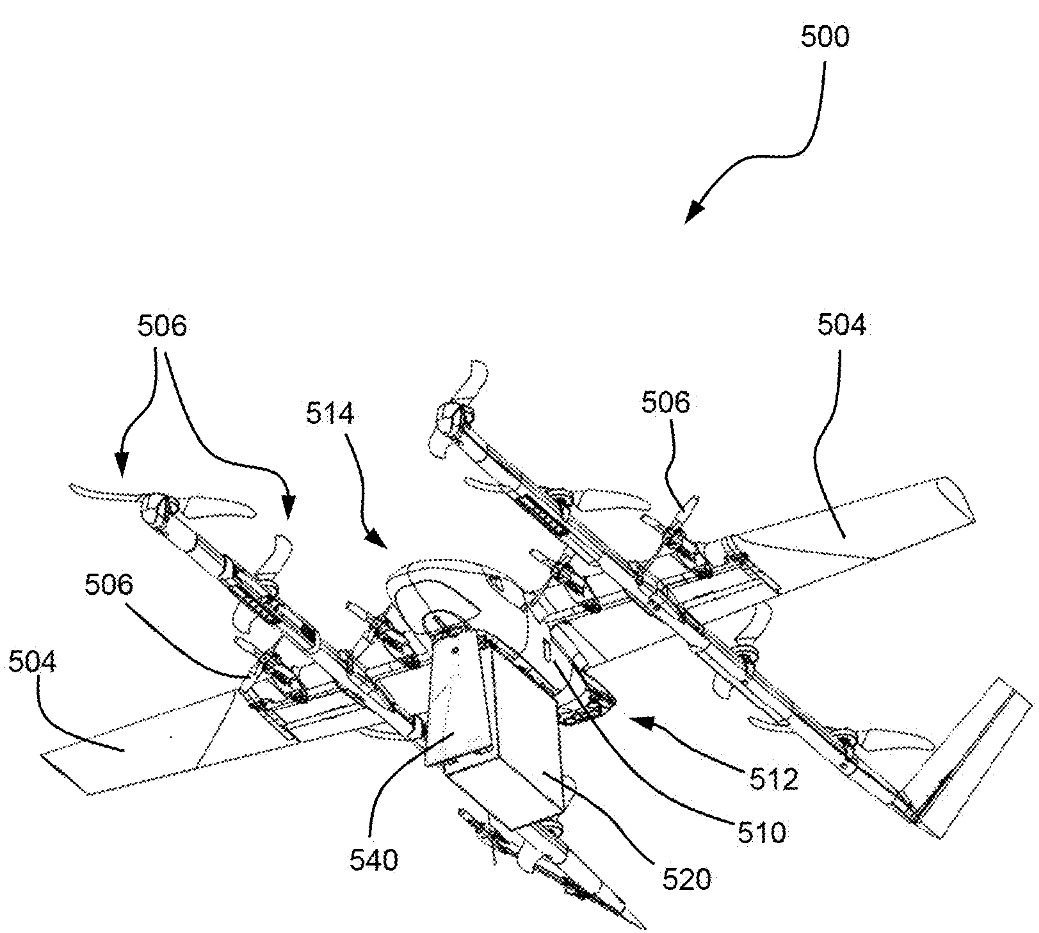
FIG. 5 shows a lower perspective view of a UAV with an attached payload and drag reduction device in an active position according to an embodiment.

FIG. 5 illustrates an embodiment of a UAV 500 that includes a fuselage 510, a pair of wings 504 extending laterally from the fuselage 510, a plurality of lift rotors 506 and a group of thrust rotors 508. The fuselage 510 extends along a first direction from a rear end 512 to a front end 514.

The UAV 500 is shown airborne and carrying a payload 520 that is secured to the lower side of the fuselage 510. The payload 520 is held against an outer surface of the fuselage 510 such that a portion of the payload extends outward from the UAV and is exposed. In other words, a portion of the payload is external to the fuselage. By externally carrying the payload or a portion of the payload, the size of the fuselage 510 may be smaller than if the fuselage required an internal cargo area to carry the payload.

The payload 520 is exposed or external in that it extends outside the frontal area or front profile of the fuselage. In the illustrated embodiment, the payload 520 extends below the fuselage 510. As a result of the payload extending below the fuselage 510 and outside the frontal area of the fuselage, air in the path of the UAV must flow around the payload, which leads to increased drag. To reduce the drag that would otherwise result from the exposed payload 520, the UAV 500 includes a drag reduction device 540 positioned in front of the payload 520.

While the illustrated embodiment shows the drag reduction device underneath the fuselage, the drag reduction device may be positioned in other areas depending on the position of the exposed portion of the payload. For example, in some embodiments, the payload may be carried on top of the UAV, rather than under the UAV. In such an embodiment, the drag reduction device may extend upward from the fuselage, rather than down from the fuselage. Likewise, if the UAV held a payload to the side of the fuselage, the drag reduction device may extend laterally outward to reduce drag in such a configuration. Further, while the UAV in the illustrated embodiment includes wings extending outward from the fuselage, the drag reduction device of the disclosure may be used with other aircraft configurations, such as a multicopter with several rotors positioned around a central body that forms the fuselage.

Further, while the payload shown in FIG. 5 is entirely external to the fuselage, in other embodiments, the drag reduction device of the disclosure may be used with payloads that are only partially external and have an exposed portion. For example, in some embodiments, the fuselage may include an open cargo area that is adapted to hold a portion of a payload, with a remainder of the payload extending outward from the fuselage. In such a case, a drag reduction device may be positioned in front of the exposed portion of the payload.

Figure 6:
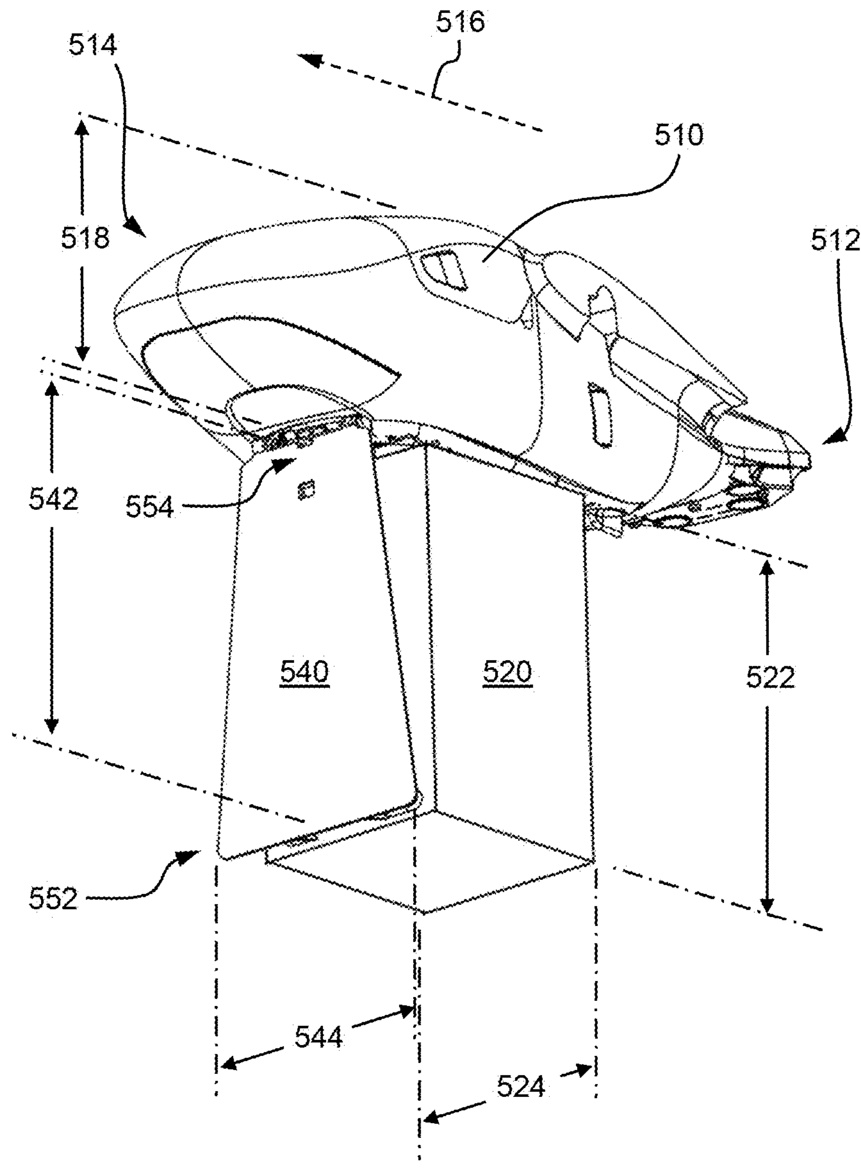
FIG. 6 shows a more detailed view of the fuselage, payload and drag reduction device of FIG. 5.

FIG. 6 illustrates a lower perspective view of the fuselage 510 of UAV 500 (isolated from the wings, booms, and rotors, for clarity) while carrying an exposed payload 520 in accordance with an embodiment of the disclosure. The fuselage 510 extends along a direction 516 from a rear end 512 to a front end 514. The direction 516 that the fuselage 510 extends is also the direction of forward flight of the fuselage 510. To reduce the drag associated with the payload 520, the UAV also includes a drag reduction device 540 that extends downward from the fuselage 510. In the illustrated orientation, the drag reduction device 540 is disposed in an active position against the payload 520, which occurs when the UAV is flying forward at a speed above a certain threshold.

The fuselage 510 has a height 518 and the payload 520 extends below the lower side of the fuselage 510 such that the payload will influence the drag of the UAV. Because the payload 520 is entirely external to the fuselage 510, the degree to which the payload 520 extends outward from the fuselage is based on the height 522 of the payload 520. FIG. 6 also illustrates that the payload has a width 524, which also influences the drag associated with the payload. The direction that is described herein as the width is the lateral direction that is perpendicular to the direction of flight 516 and the height 518 of the fuselage 510.

The drag reduction device 540 has a length 542 that is measured from a free distal end 552 of the drag reduction device 540 to an attached proximal end 554 of the drag reduction device 540 that is adjacent to the fuselage 510. In the orientation shown in FIG. 6, the drag reduction device 540 is fully deployed and the length 542 of the drag reduction device 540 is substantially parallel to the height 518 of the fuselage 510 and the height 522 of the payload 520. The drag reduction device 540 also has a width 544 that is parallel to the width 524 of the payload and is perpendicular to the direction of flight of the UAV.

Figure 7:
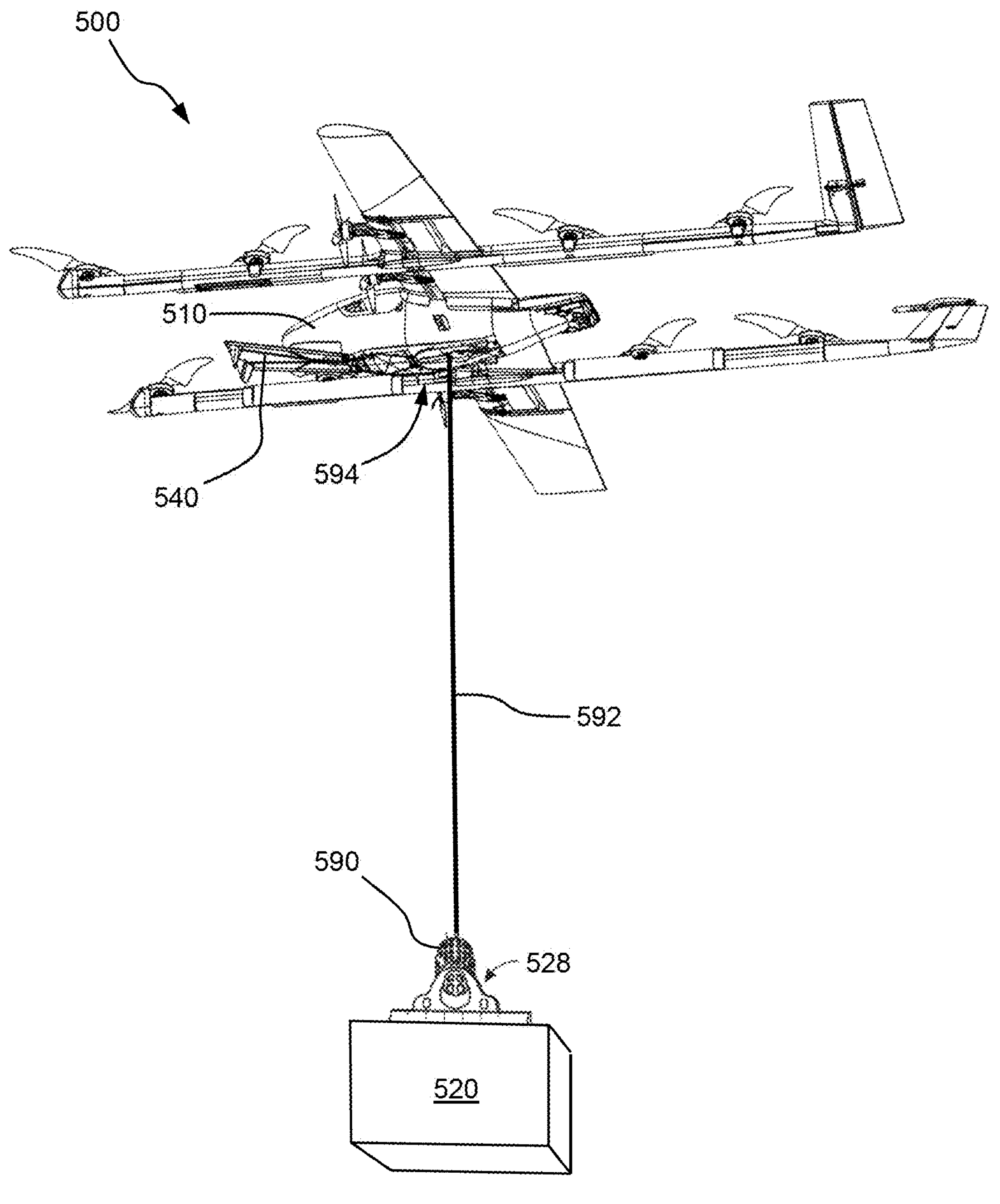
FIG. 7 shows a UAV lowering a payload using a payload delivery system according to an embodiment.

In some embodiments, the UAV includes a payload delivery system that includes a tether and payload coupling apparatus that is configured to draw the payload into the external storage area of the UAV and hold the payload in place. For example, as shown in FIG. 7, UAV 500 includes a payload coupling apparatus 590 that forms a hook, which is configured to secure a handle 528 of a payload 520. The payload coupling apparatus 590 is disposed on the end of a tether 592 which may be retracted to pull the payload 520 up to the UAV 500 while the UAV is in flight. The fuselage 510 of the UAV 500 further includes a receptacle 594 in the form of a slot that is adapted to receive the handle 528. Once the payload 520 has been drawn against the lower surface of the fuselage 510, a latching system can be used to hold the handle 528 in place and secure the payload 520 in the external storage area of the UAV.

As explained in further detail below, the drag reduction device 540 may be movable between various positions during operation of the UAV, to accommodate different stages of the delivery of a payload. For example, in FIG. 7, the UAV 500 is hovering as the payload 520 is being lifted up to the fuselage 510. Accordingly, the drag reduction device 540 may extend forward as depicted which may avoid interference with the payload 520 as it is raised up to the fuselage 510.

Figure 8A:
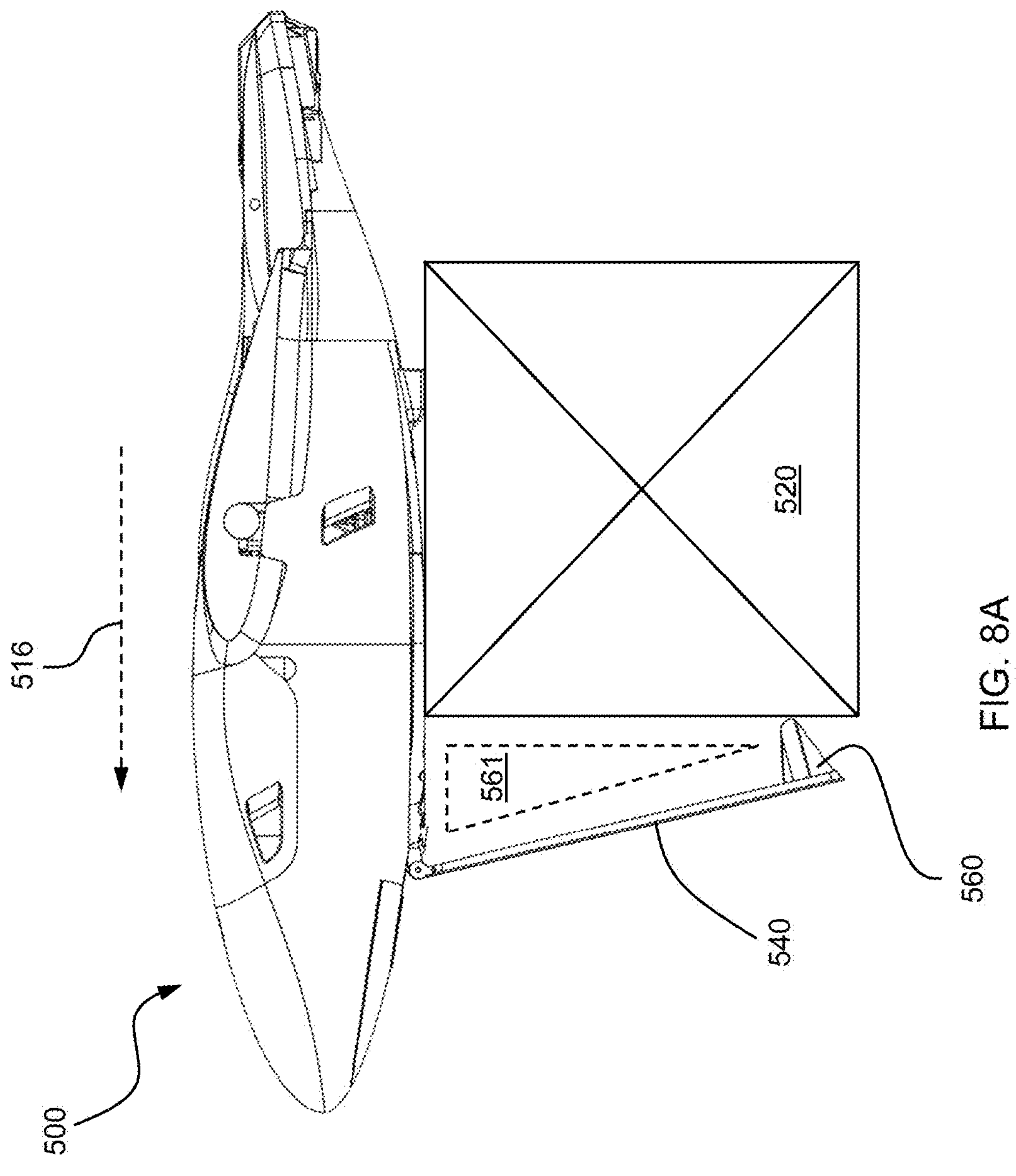
FIG. 8A shows a side view of a fuselage with a payload and a drag reduction device in an active position according to an embodiment.

FIG. 8A illustrates a side view of UAV 500 carrying an exposed payload 520. For simplicity, the booms, wings, and rotors are removed in FIGS. 8A-8D to more clearly illustrate the fuselage 510 and drag reduction device 540. The UAV 500 includes a fuselage 510 that extends along a first direction 516 that is aligned with the direction of flight of the UAV. The UAV 500 includes an external payload storage area that is positioned under the fuselage. The external payload storage area is defined by a structural component of the fuselage, such as attachment component for holding a payload or a surface or cavity designed to receive a side of a payload.

The side view of FIG. 8A illustrates the air that flows around the fuselage 510 and around the drag reduction device 540 and payload 520 when the UAV is moving in the forward direction. As shown, the drag reduction device 540 is spaced from the payload 520 by a standoff 560, which forms a low pressure zone 561 between the drag reduction device 540 and the payload 520, resulting in a lower drag when the drag reduction device 540 is placed in front of the payload 520 compared to when the payload 520 is carried without the drag reduction device. It should be understood, that the drag reduction device 540 is not a fairing, and that the drag reduction device 540 is spaced from the payload by the standoff 560. In some embodiments, the standoff is formed with the drag reduction device in a single integral piece, while in other embodiments, the standoff is separate from but coupled to the drag reduction device or may be integrated with the payload.

The drag reduction device described herein is operable to reduce the drag associated with an exposed payload, and is not merely an aerodynamic feature of the fuselage. Accordingly, the drag reduction device has a sufficient length to influence air flowing around the payload, and reduce the drag associated with the payload. For example, in some embodiments, the drag reduction device has a length that is at least 25% of the height of the fuselage, or at least 50% of the height of the fuselage. Further, in some embodiments, the length of the drag reduction device is greater. For example, in some embodiments, the length of the drag reduction device is at least as large as the height of the fuselage, such that the height of the fuselage is smaller than the length of the drag reduction device.

In FIG. 8A, the UAV 500 is moving forward along first direction 516 with sufficient velocity that air resistance pushes the drag reduction device 540 rearward until the standoff 560 engages the payload 520. As a result, the drag reduction device 540 extends downward from the fuselage 510 when it is in an active position in front of the payload 520. The term downward, as used herein, means a direction that is closer to a vertical downward direction than a horizontal direction, for example, within 45 degrees of a vertical downward direction.

Figure 8B:
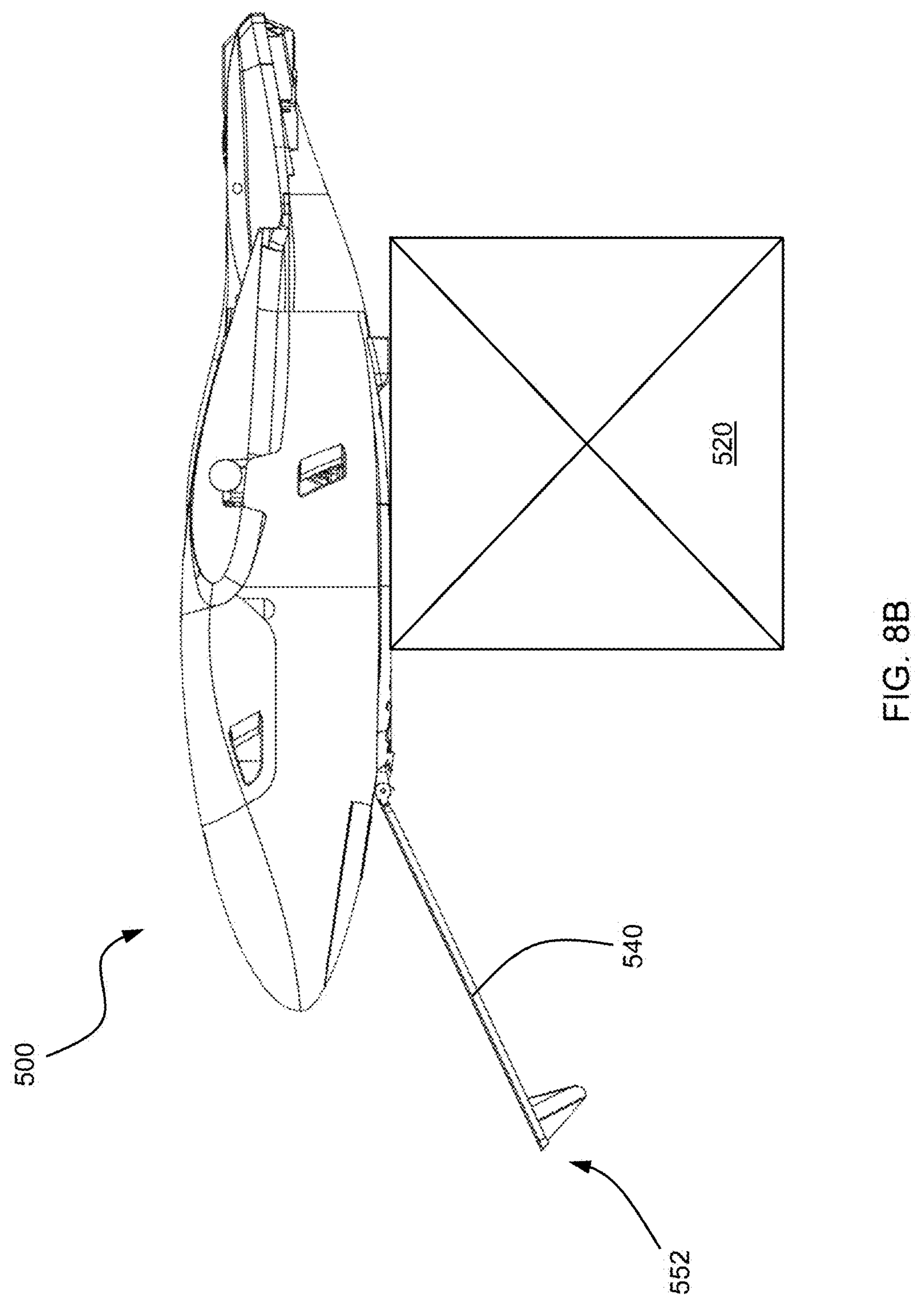
FIG. 8B shows a side view of the fuselage, payload, and drag reduction device of FIG. 8A with the drag reduction device in a rest position according to an embodiment.

However, in order to avoid interference between the drag reduction device 540 and the payload 520 during retrieval and delivery of the payload 520, the drag reduction device 540 may be biased forward, for example by a spring, as explained in more detail below. Accordingly, when the UAV 500 slows down or is hovering and air resistance is no longer pushing the drag reduction device rearward, the drag reduction device 540 may rotate forward and away from the payload 520. For example, FIG. 8B shows UAV 500 in a hover flight mode in which the rearward aerodynamic force against the drag reduction device 540 is absent. When insufficient rearward aerodynamic force is present to move the drag reduction device in a rearward direction, the drag reduction device 540 may be disposed in a rest position, in which the distal end 552 extends forward and the drag reduction device 540 is not set against the payload 520. The term forward, as used herein, means a direction that is closer to a horizontal forward direction than a vertical direction, for example, within 45 degrees of a horizontal forward direction.

Figure 8C:
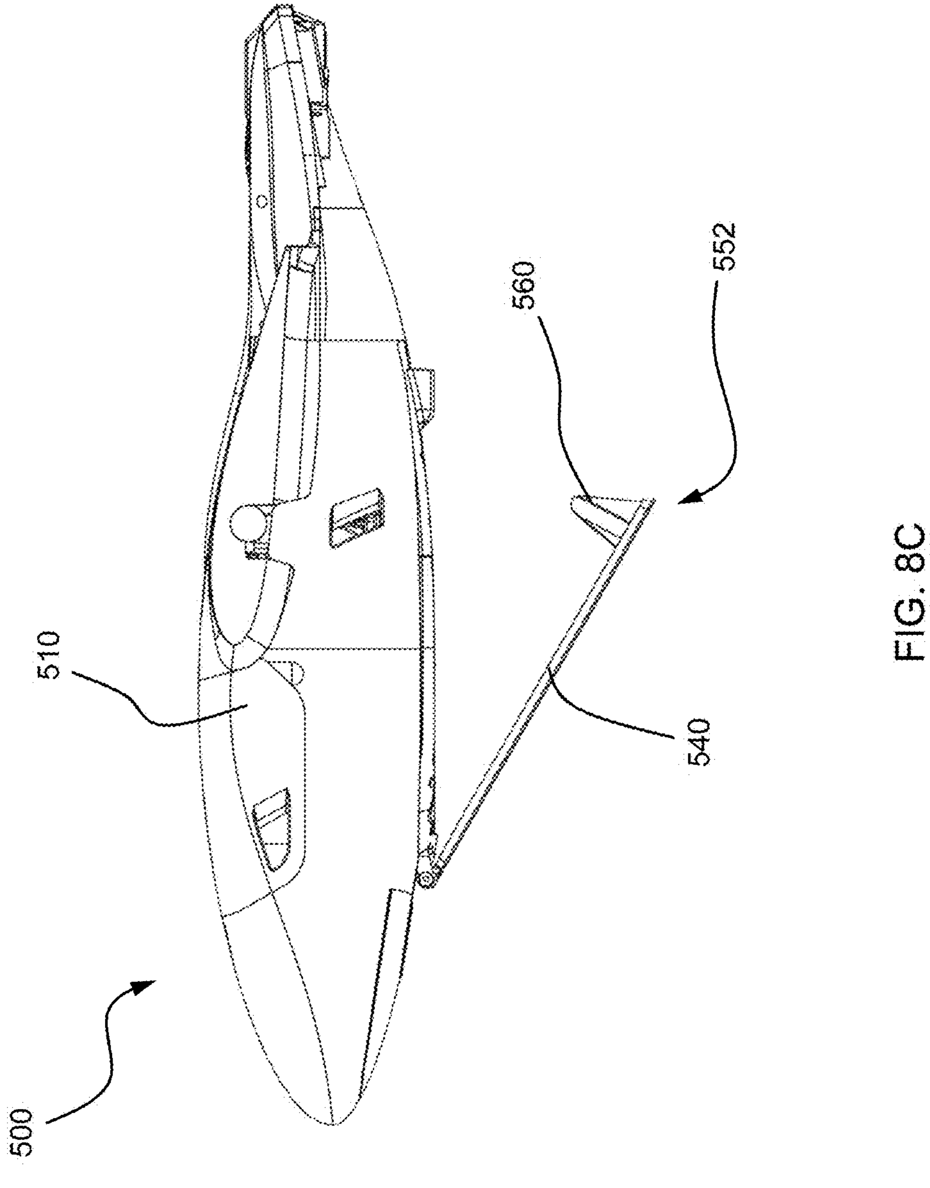
FIG. 8C shows a side view of the fuselage and drag reduction device of FIG. 8A with the drag reduction device in a cruise position according to an embodiment.

In some embodiments, the drag reduction device is rotatable beyond the range between the active position shown in FIG. 8A and the rest position shown in FIG. 8B. For example, FIG. 8C illustrates the UAV 500 flying along the first direction 516 after the payload has been delivered and is no longer attached to the fuselage 510. Similar to FIG. 8A, air resistance caused by the UAV 500 flying forward is pushing the drag reduction device rearward. In this case, because the payload is not present to engage the standoff 560, the drag reduction device 540 is pushed back further to a cruise position. Specifically, the distal end 552 of the drag reduction device 540 is further rearward relative to the fuselage 510 when in the cruise position shown in FIG. 8C in comparison to the active position shown in FIG. 8A. When in the cruise position, the drag reduction device 540 is also lifted further toward the fuselage 510, such that the frontal area occupied by the drag reduction device 540 is reduced when it is in the cruise position compared to when it is in the active position and in some embodiments may rotate further rearward, including until the standoffs engage the fuselage. Accordingly, the drag that is caused by the drag reduction device is reduced when in the cruise position compared to the drag that would result if the drag reduction device remained in the active position. It should be understood that the drag reduction device is effective at reducing drag associated with a payload attached to the fuselage, and that a drag reduction device in accordance with the disclosure, when operating on a UAV without an exposed payload, will not necessarily reduce drag.

Figure 8D:
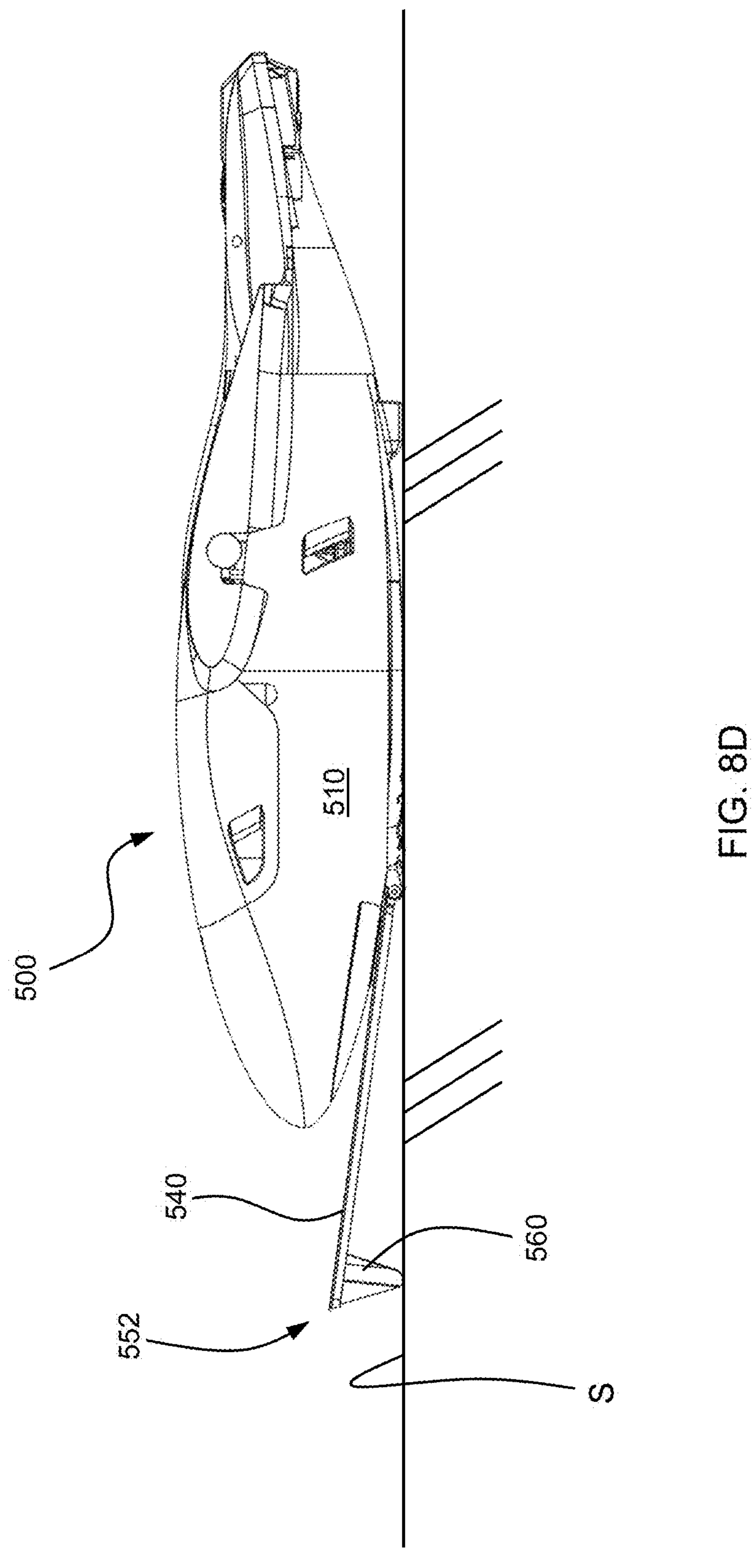
FIG. 8D shows a side view of the fuselage and drag reduction device of FIG. 8A with the drag reduction device in a landing position according to an embodiment.

In some embodiments, the drag reduction device may also be rotatable to a higher forward position compared to the rest position shown in FIG. 8B to facilitate landing. For example, FIG. 8D shows UAV 500 having landed on a surface S with the bottom of the fuselage 510 adjacent to the surface S. The drag reduction device 540 has been pushed upward by the standoff 560 to a landing position in which the distal end 552 of the drag reduction device 540 is higher relative to the fuselage 510 than in the rest position shown in FIG. 8B. This allows the UAV to land with the fuselage 510 engaging the surface S without the drag reduction device 540 interfering with the landing.

Figure 9A:
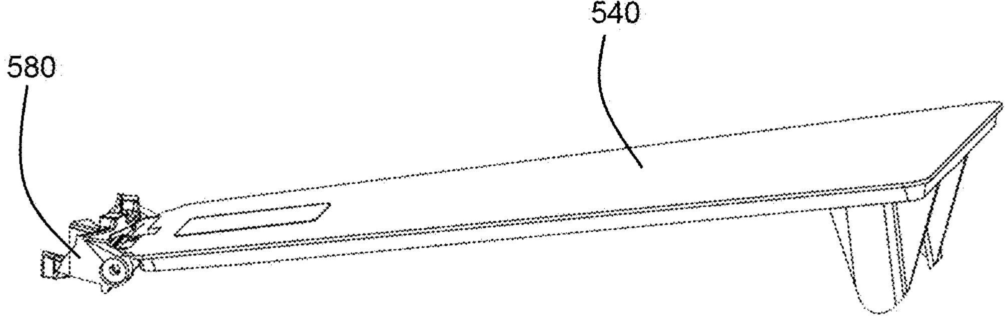
FIG. 9A shows a side perspective view of a drag reduction device attached to a bracket according to an embodiment.
Figure 9B:
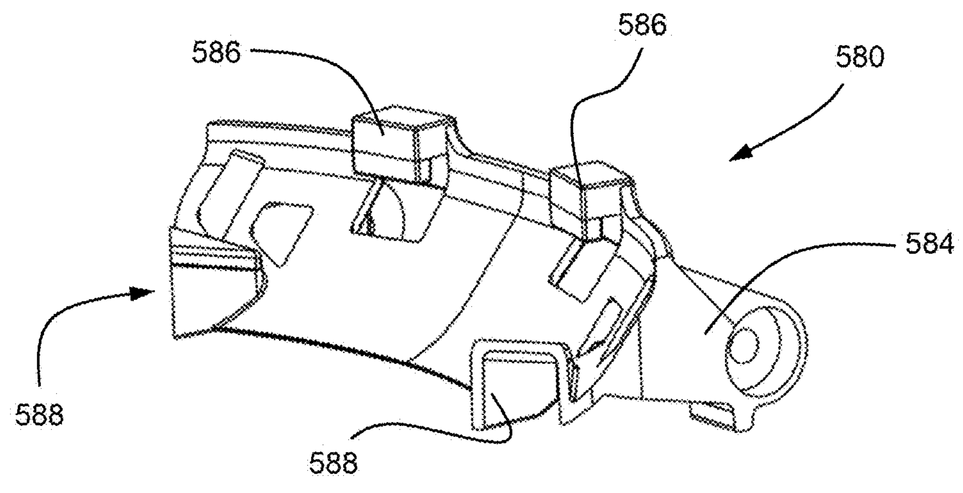
FIG. 9B shows a rear side perspective view of the bracket of FIG. 9A.
Figure 9C:
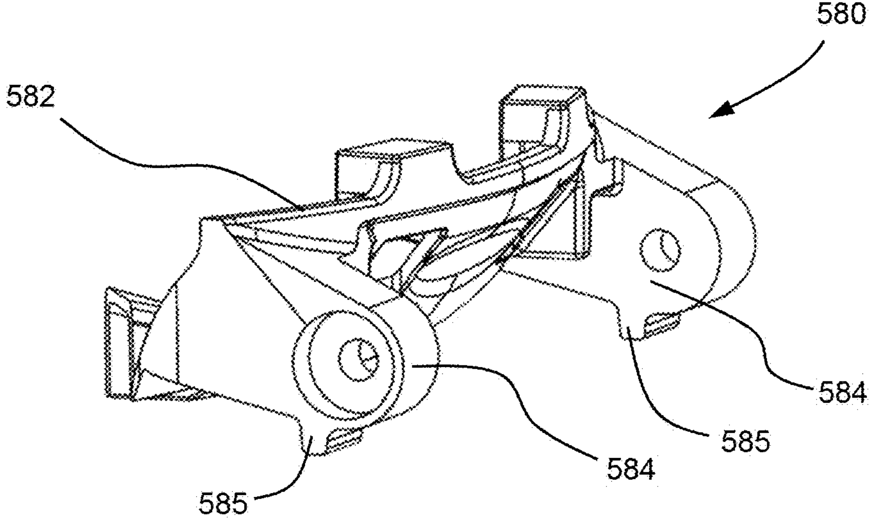
FIG. 9C shows a front side perspective view of the bracket of FIG. 9A.

In some embodiments, the drag reduction device may be coupled to a bracket that secures the drag reduction device to the fuselage of the UAV. For example, FIG. 9A illustrates drag reduction device 540 coupled to bracket 580, which is configured to be secured to fuselage 510, shown in FIG. 6. FIGS. 9B and 9C are perspective views of the bracket 580 alone, which respectively show the interior and exterior of the bracket 580. As shown in FIGS. 9B and 9C, the bracket 580 includes a support body 582 and a pair of prongs 584 extending outward from the support body 582. Further, attachment features 586, 588 on the support body 582 of the bracket 580 are adapted to secure the bracket 580 to the fuselage 510, as explained below.

The two prongs 584 extending from the support body 582 are adapted to support a shaft, such as a hinge bolt, that couples to the drag reduction device 540. Each of the prongs 584 includes an aperture to accommodate the shaft and a respective circular recess on its outer side that receives hardware for securing the shaft in place. Each of the prongs 584 also includes a respective spacer foot 585 that extends downward. These spacer feet 585 are configured to space the proximal end of the drag reduction device and the associated attachment elements away from a landing surface when the UAV lands. For example, as explained above and in more detail below, the drag reduction device 540 may be secured to the bracket 580 by a spring that urges the drag reduction device 540 toward the rest position. Such a spring may be made of, or at least include, metal or other conductive materials. The spacer feet 585 can help avoid the possibility that the conductive parts of the spring come in contact with the landing surface. This may be particularly desirable where the landing surface includes electrical components, such as when the landing surface is a charging pad.

The bracket 580 also includes two hooks 586 disposed on the top of the interior side of the support body 582. The two hooks 586 are configured to hook onto a lip of a structural component of the fuselage to attach the bracket 580 to the fuselage. The support body 582 also includes a pair of bosses 588 that are adapted to cooperate with an open area inside the fuselage to further secure the bracket 580 to the fuselage. The illustrated embodiment, with the hooks 586 and bosses 588 allows the bracket 580 to be attached to the fuselage without any fasteners. This can allow quick replacement of the bracket and drag reduction device for maintenance. While the shown embodiment includes two hooks and two bosses, other embodiments of the bracket may include only one of these types of attachment structures, rather than both, may include more or fewer of such attachment structures, or may include other types of attachment structures. Furthermore, in some embodiments, the bracket may be secured to the fuselage with more permanent attachment devices, such as mechanical fasteners like screws and bolts. Further still, in some embodiments, the drag reduction device may be secured more directly to the structure of the fuselage, rather than to a bracket.

Figure 10A:
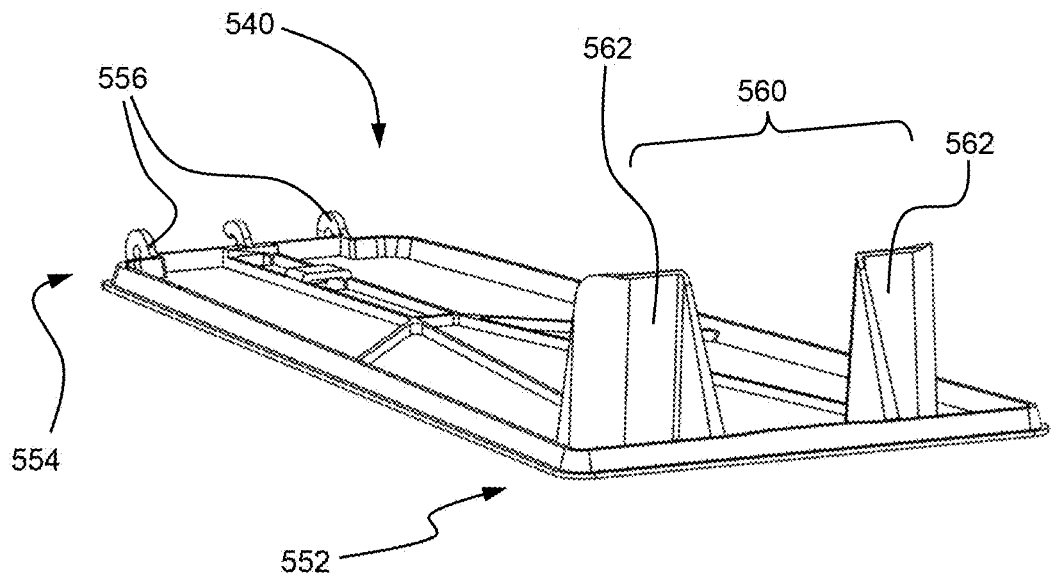
FIG. 10A shows a perspective view of a rear side of a drag reduction device according to an embodiment.
Figure 10B:
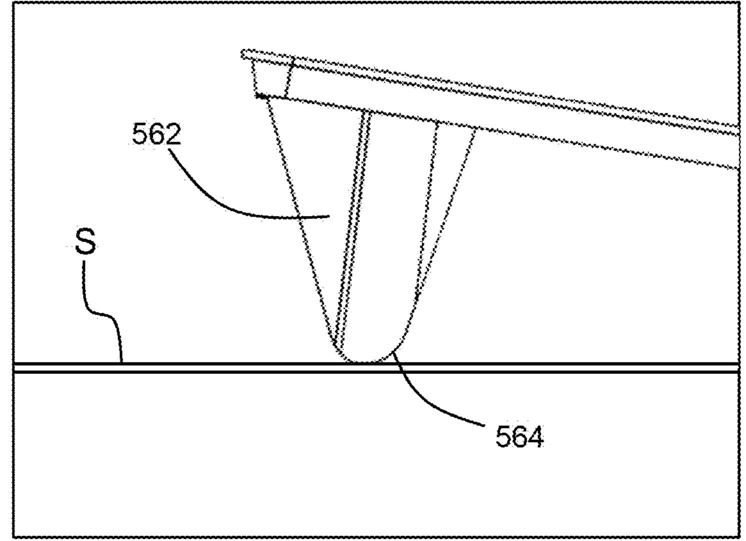
FIG. 10B shows a side view of a portion of the drag reduction device of FIG. 10A engaging a surface.

FIGS. 10A and 10B illustrate further aspects of the exemplary illustrated embodiment of the standoff 560 and drag reduction device 540. As shown in FIG. 10A, a body of the drag reduction device 540 of the illustrated embodiment is configured as a flat plate with structural elements on the rear surface of the plate for adding strength and other functions, as explained further below. In some embodiments, the thickness of the plate of the body of the drag reduction device may be less than 1 cm, or less than 6 mm, such as in a range of 1-6 mm. Reducing the thickness of the plate may reduce weight of the drag reduction device. Furthermore, a thinner plate may also form cleaner, more distinct flow separation at the edges of the drag reduction device.

Figure 11A:
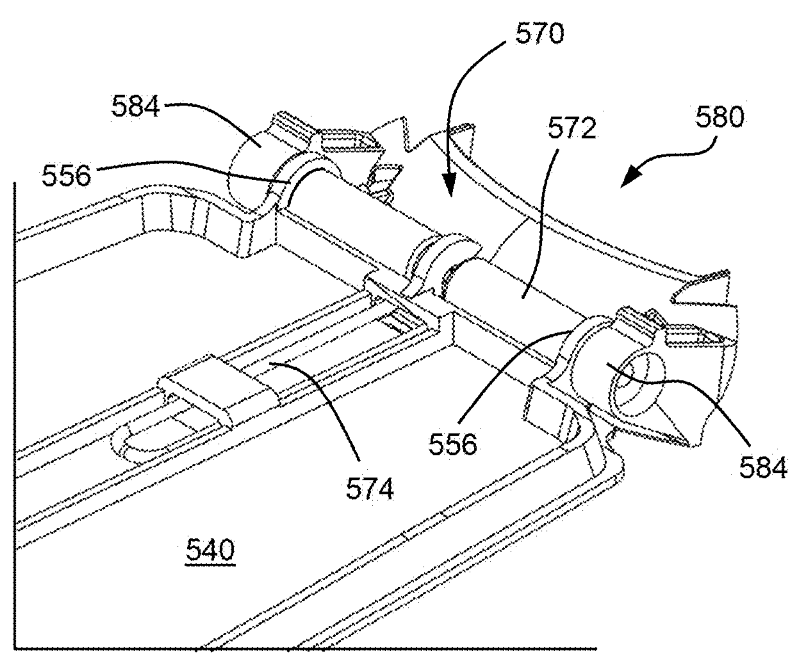
FIG. 11A shows a detailed view of a hinge between a drag reduction device and bracket according to an embodiment.
Figure 11B:
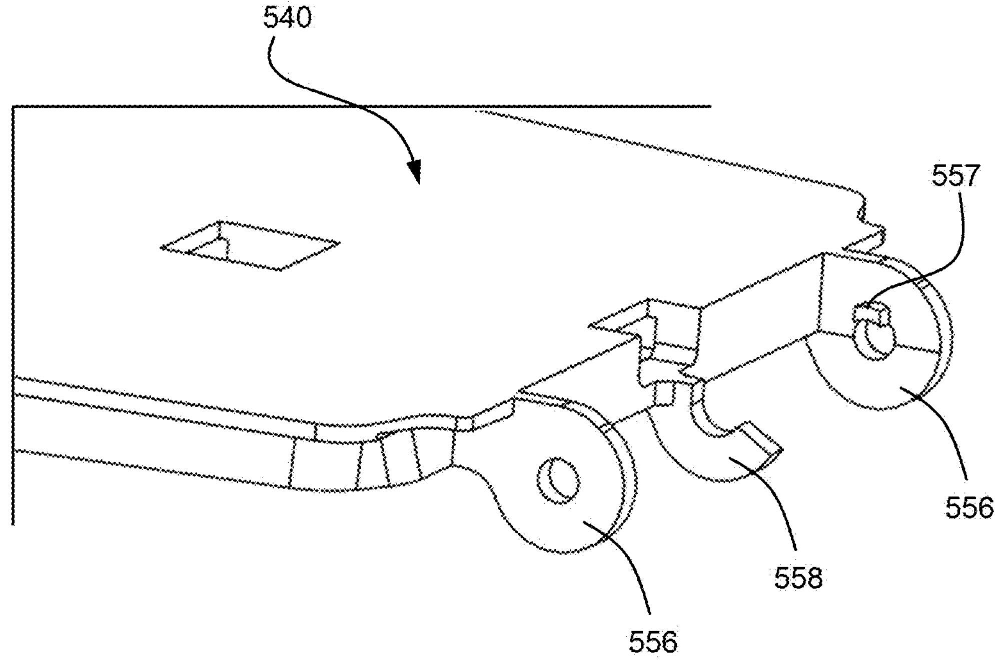
FIG. 11B shows a detailed view of a proximal end of the drag reduction device of FIG. 11A.

In the illustrated embodiment shown in FIG. 11B, two circular flanges 556 extend outward from the plate at the proximal end 554 of the drag reduction device 540 for securing to a hinge (see also, FIG. 11B). In other embodiments, the drag reduction device may include more than two flanges for securing to a hinge, a single wider attachment, or other attachment configurations, such as being integrally formed with a shaft that mounts in hinge elements of the bracket or fuselage.

The standoff 560 extends rearward from the drag reduction device 540 and is configured to engage against a payload so as to hold the drag reduction device 540 at a distance from the payload, such that a low pressure zone is formed between the drag reduction device 540 and payload.

In the illustrated embodiment, the standoff 560 is configured as a pair of feet 562 disposed near the distal end 552 of the drag reduction device 540, which are positioned on opposing lateral halves of the drag reduction device 540, and spaced apart from one another. The two feet 562 have a similar configuration, but are symmetrical across a longitudinal centerline of the drag reduction device 540. The use of two separate feet, rather than a single structure, reduces the weight of the standoff, while still allowing the standoff to have an effective width that extends over a majority of the width of the drag reduction device. Of course, in other embodiments, the standoff may have other configurations, such as a single foot, or more than two feet, a single laterally extending ridge, or others.

In some embodiments, each of the feet standoff extends laterally across a portion of the drag reduction device. This may allow an attached payload to move around, e.g., to swing during turns or in the wind, without an edge of the payload catching against the end of the standoff. For example, in the illustrated embodiment, each of the feet 562 extends laterally across a portion of the drag reduction device 540. As a result, if the standoff 560 is being supported against a payload that tilts in either direction, the engagement between the standoff 560 and the front end of the payload may remain intact, and avoid having the standoff 560 catch against a side of the payload. In various embodiments of the standoff, each of the feet may extend across at least 15% or at least 20% of the width of the drag reduction device.

Further, in some embodiments, the standoff may include a contact surface that is curved with respect to a side view of the UAV such that the standoff is configured to roll over against any surface it engages. For example, such a curved contact surface is included in the illustrated embodiment of the standoff. As shown in FIG. 10B, the inner end of foot 562 includes a curved contact surface 564. This curved contact surface 564 allows the foot 562 to roll against a surface that it engages. For example, when the UAV is landing on a landing surface S, as shown in FIG. 10B, the contact surface 564 of the foot 562 can roll against the landing surface, thereby reducing the likelihood that the standoff may damage the surface. This may be beneficial if the landing surface is a functional component, such as a charging pad.

FIGS. 11A and 11B illustrate details of an example embodiment of a connection between a drag reduction device and a bracket that connects to a fuselage. Such a connection could also be used directly between the drag reduction device and the fuselage. Further, in other embodiments, other configurations of a connection between a drag reduction device and fuselage may be used. FIGS. 11A and 11B show the embodiment used in exemplary UAV 500 shown throughout FIGS. 5-12. As shown, the circular flanges 556 at the proximal end of the drag reduction device 540 are positioned between the prongs 584 of the bracket 580 to form parts of a hinge 570 that connects the drag reduction device 540 to the bracket 580. The prongs 584 and flanges 556 are aligned so that a shaft, such as a hinge bolt, may pass through the circular flanges 556 and prongs 584 to hold the hinge 570 together.

The illustrated hinge 570 also includes a double torsion spring 572, the body of which is schematically depicted as a pair of cylinders. The double torsion spring 572 includes a central leg 574 that fits within a channel in the drag reduction device 540. The torsion spring 572 also includes two end legs that are secured to the bracket 580. The torsion spring 572 is configured to return the drag reduction device 540 to the rest position shown in FIG. 8B when the UAV is hovering. In other embodiments, another configuration of a spring element may be used to return the drag reduction device to a rest position. For example, in embodiments similar to the illustrated embodiment, the hinge may include a single torsion spring, or multiple torsion springs. In other embodiments, a coil spring or tension spring may act on the drag reduction device to return it to a rest position. Other configurations are also possible.

In some embodiments, the torsion spring may be formed of metal, accordingly, the hinge may include features to avoid the potential for the spring to contact a landing surface, such as a charging pad. For example, in the illustrated embodiment, the circular flanges 556 are larger than the outer diameter of the torsion spring 572, so that the circular flanges 556 may hold the torsion spring 572 away from the landing surface. Likewise, as shown in FIG. 111B, the circular flanges 556 may include tabs 557 that capture the inner diameter of the torsion spring 572. The tabs 557 are positioned toward the front surface of the draft reduction device 540, so that the tabs 557 may help hold the torsion spring 572 away from the landing surface, which may be on the opposite side of the drag reduction device 540.

The drag reduction device 540 also includes a central partial round 558 that extends around the hinge bolt. The central partial round 558 also provides a physical offset between the torsion spring 572 and the landing surface. This central partial round 558 may also transfer bending loads between the proximal end 554 of the drag reduction device 540 and the hinge bolt, which can help avoid cupping of the drag reduction device about its vertical axis.

Figure 12:
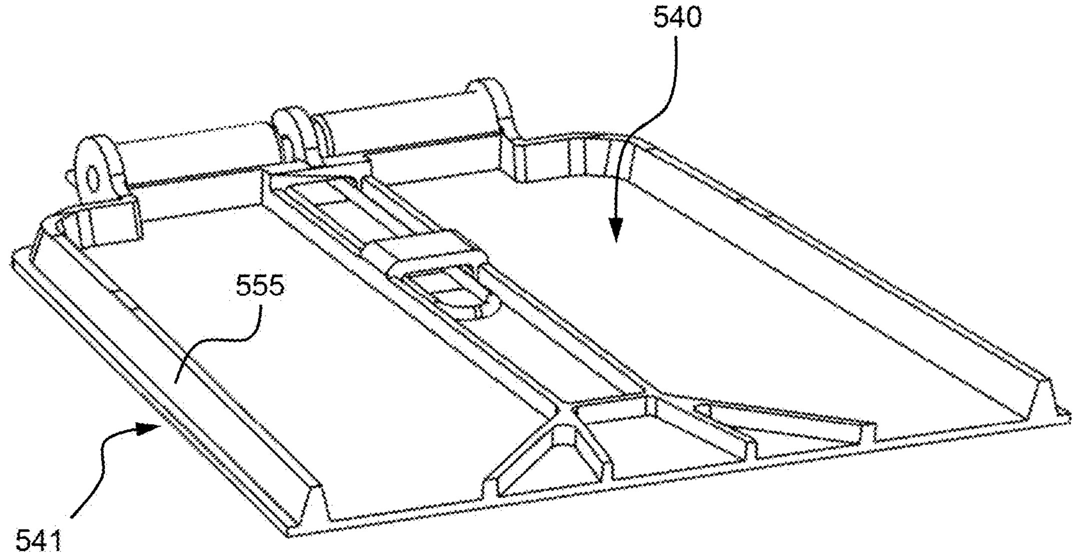
FIG. 12 shows a detailed view of a portion of a rear side of a drag reduction device according to an embodiment.

FIG. 12 illustrates a proximal portion of the illustrated embodiment of the drag reduction device 540. As shown, the rear side of the drag reduction device 540 includes a plurality of ribs that help stiffen the flat plate that forms the drag reduction device 540. A perimeter rib 555 extends around at least a portion of the drag reduction device 540 adjacent to the lateral edge 541 of the drag reduction device 540. In addition to providing structural support to the drag reduction device, the perimeter rib 555 also helps avoid the edge 541 of the drag reduction device 540 from being caught in a narrow cavity or slot, such as a slot in a payload coupling apparatus as shown in FIG. 7. In some embodiments, the perimeter rib may have a tapered A-frame cross section, to further help avoid insertion into narrow areas.

In some embodiments, the perimeter rib may be set back from the outer edge. Such a configuration may help avoid the boundary layer from attaching to the edge of the drag reduction device and limit its effectiveness in reducing drag. For example, as shown in FIG. 12, in the illustrated embodiment, the perimeter rib 555 is set back from the lateral edge 541 of the drag reduction device 540.

The drag reduction device in accordance with the disclosure may have a range of different shapes, as shown in FIGS. 13-22. FIGS. 13-17 show different cross sectional shapes of several embodiments of drag reduction devices in accordance with the disclosure, while FIGS. 18-22 show embodiments of drag reduction devices with various different front profiles.

Figure 13:
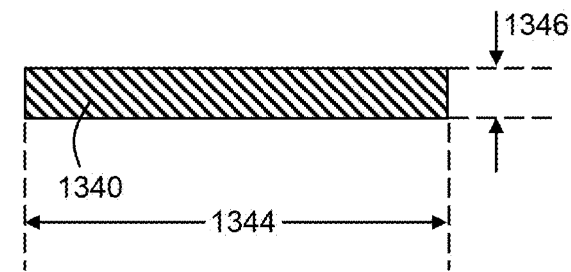
FIG. 13 shows a cross-sectional view of an embodiment of a drag reduction device.

FIG. 13 shows a cross-section of a drag reduction device 1340 in the form of a flat plate. The plate has a width 1344 and a depth 1346 that is equal to the material width of the plate. In other embodiments, the cross-sectional area of the drag reduction device has a more complex shape.

Figure 14:
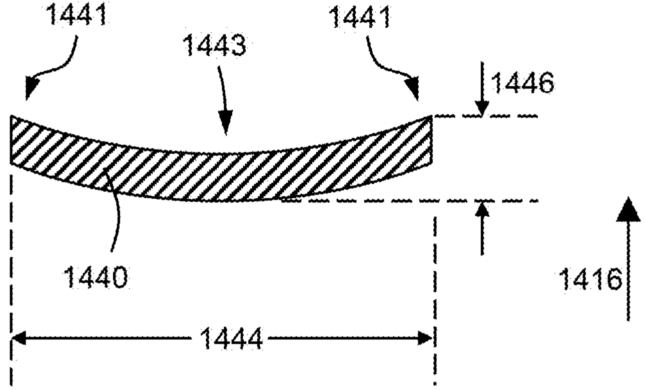
FIG. 14 shows a cross-sectional view of another embodiment of a drag reduction device.

For example, FIG. 14 shows a cross-section of an embodiment of a drag reduction device 1440 that is bowed has two lateral edges 1441 that are in front of a central portion 1443 of the drag reduction device 1440, such that the central portion 1443 is rearward of the lateral edges 1441. The direction of flight 1416 is shown for reference. The width 1444 extends from one lateral edge 1441 to the other, while the depth 1446 is the full extent that the drag reduction device 1440 extends in the first direction 1416.

Figure 15:
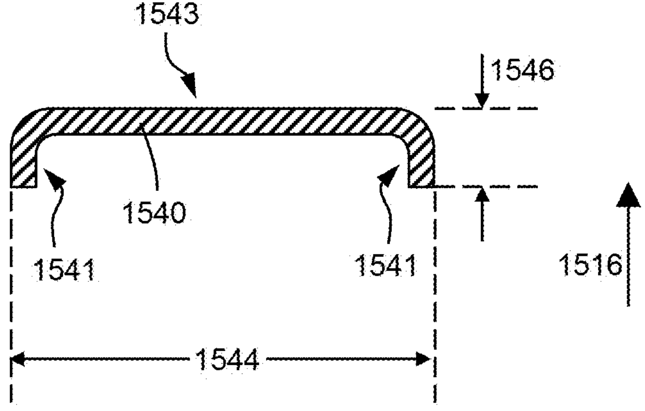
FIG. 15 shows a cross-sectional view of yet another embodiment of a drag reduction device.

FIG. 15 shows a cross-section of an embodiment of a drag reduction device 1540 that has the shape of channel and includes a central web 1543 and two lateral flanges 1541. The direction of flight 1516 is shown for reference. The width 1544 extends from one flange 1541 to the other, while the depth 1546 is the full extent that the drag reduction device 1540 extends in the first direction 1516.

Figures 16, 17:
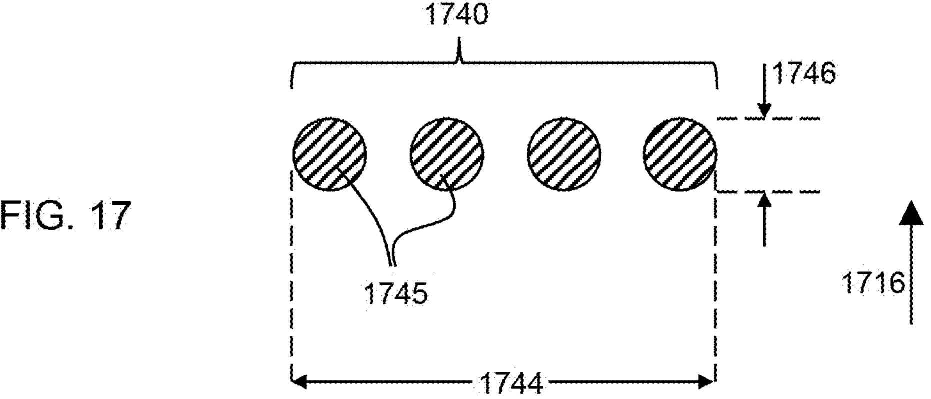
FIG. 16 shows a cross-sectional view of another embodiment of a drag reduction device.
FIG. 17 shows a cross-sectional view of another embodiment of a drag reduction device.

FIG. 16 shows a cross-section of an embodiment of a drag reduction device 1640 that generally has the shape of a plate, but includes a central spar 1643 and outer ribs 1641. The direction of flight 1616 is shown for reference. The width 1644 extends from one rib 1641 to the other, while the depth 1646 is defined by the ribs and the central spar, and is based on the full extent that the drag reduction device 1640 extends in the first direction 1616.

FIG. 17 shows a cross-section of an embodiment of a drag reduction device 1740 that is formed by four individual rods 1745. The width 1744 is defined from the outer side of one rod to the opposing outer side of the rod at the far side of the drag reduction device 1740, whereas the depth 1746 is based on the thickness of the rods.

Figure 18:
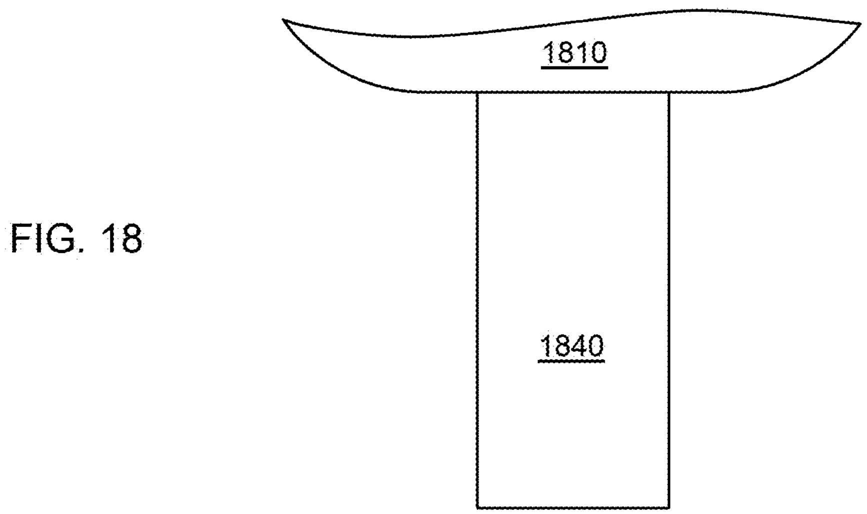
FIG. 18 shows a front view of an embodiment of a drag reduction device.

FIG. 18 shows a front view of an embodiment of a drag reduction device 1840 extending from a fuselage 1810. The drag reduction device 1840 is the shape of a rectangular plate.

Figure 19:
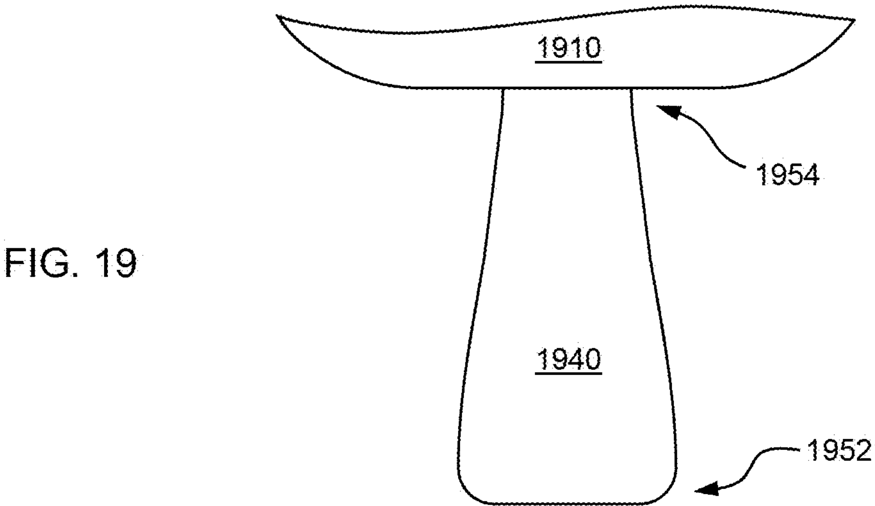
FIG. 19 shows a front view of another embodiment of a drag reduction device.

In some embodiments, the drag reduction device may be tapered. For example, FIG. 19 shows a front view of another embodiment of a drag reduction device 1940 extending from a proximal end 1954 at the surface of the fuselage 1910 to a distal end 1952. The drag reduction device 1940 tapers outward such that the distal end 1952 is wider than the proximal end 1954. The tapered shape of the drag reduction device may improve drag reduction if the payload becomes misaligned with the vertical direction.

Figure 20:
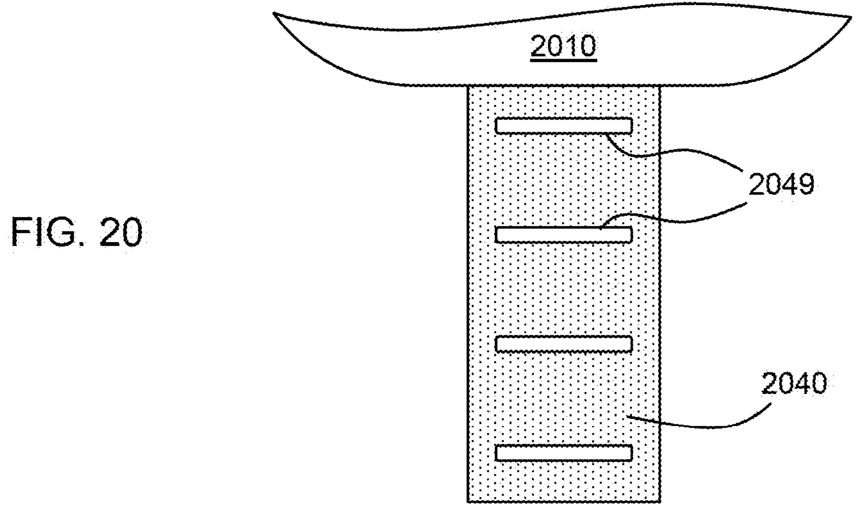
FIG. 20 shows a front view of another embodiment of a drag reduction device.

In some embodiments, the drag reduction device may include apertures. For example, FIG. 20 shows a front view of another embodiment of a drag reduction device 2040 extending from a fuselage 2010. The drag reduction device 2040 includes a plurality of apertures 2049 that extend through the depth direction of the drag reduction device. Apertures may alter the flow of air with respect to the drag reduction device and could improve drag reduction. Surface texture, such as dimples or roughness, may also have such an effect.

Figure 21:
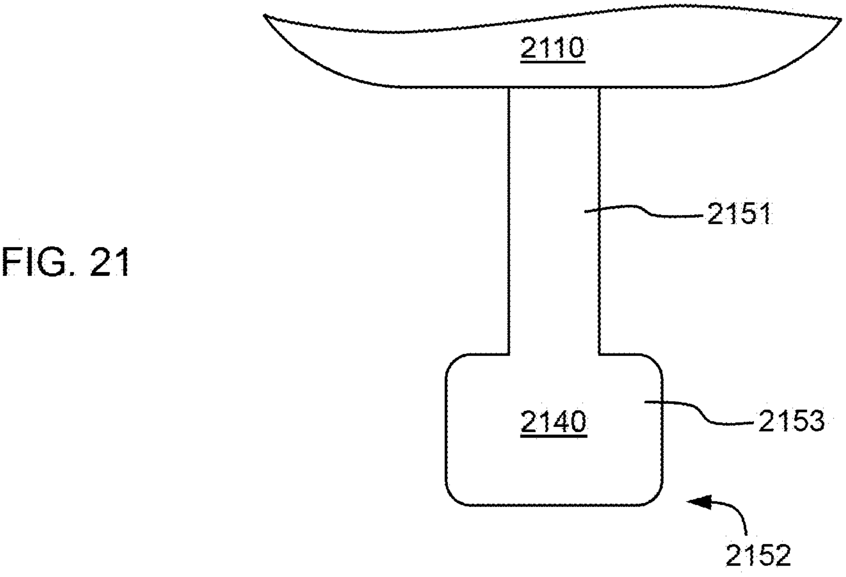
FIG. 21 shows a front view of another embodiment of a drag reduction device.

In some embodiments, the drag reduction device may include an enlarged section. For example, FIG. 21 shows a front view of another embodiment of a drag reduction device 2140 extending from a fuselage 2110. The drag reduction device 2140 has a complex shape and includes a narrow leg 2151 and an enlarged section 2153 at the distal end 2152.

Figure 22:
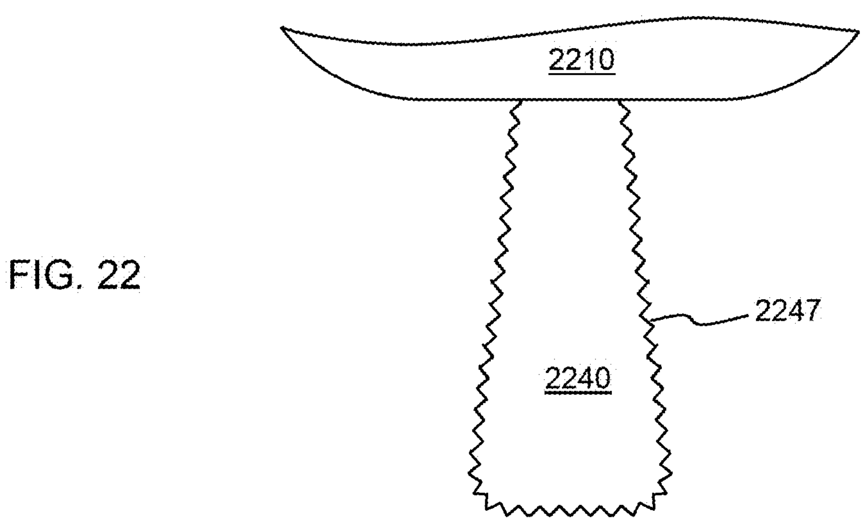
FIG. 22 shows a front view of another embodiment of a drag reduction device.

In some embodiments, the drag reduction device may include a complex geometry along the edge. For example, FIG. 22 shows a front view of another embodiment of a drag reduction device 2240 extending from a fuselage 2210 that includes a serrated outer edge 2247. Such an edge can influence the aerodynamics of the drag reduction device 2440 and may result in reduced drag.

While the above features are shown in various separate embodiments of drag reduction devices, any of the features described with respect to FIGS. 13-22 may be combined in any combination in a drag reduction device in accordance with the disclosure.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An uncrewed aerial vehicle (UAV) comprising:

a drag reduction device secured on an exterior surface of the UAV, the drag reduction device including a proximal end adjacent to the exterior surface of the UAV and a distal end, wherein the drag reduction device has an operating position in which the drag reduction device extends away from the exterior surface of the UAV; and a standoff disposed on a rear side of the drag reduction device and configured to engage a a payload secured to the UAV and hold the drag reduction device at a distance from the payload when the drag reduction device is in the operating position.

2. The UAV of claim 1, wherein the standoff includes a pair of feet that are spaced apart and disposed on opposing halves of the drag reduction device.

3. The UAV of claim 1, wherein a contact surface of the standoff is curved with respect to a side view of the UAV.

4. The UAV of claim 1, wherein a body of the drag reduction device is in the form of a plate having a front surface and a rear surface, and wherein the standoff extends from the rear surface of the plate.

5. The UAV of claim 4, wherein the drag reduction device includes a rib on the rear surface of the plate.

6. The UAV of claim 1, wherein a width of the drag reduction device is greater than a depth of the drag reduction device.

7. The UAV of claim 1, wherein the drag reduction device is wider at the distal end and narrower at the proximal end.

8. The UAV of claim 1, further comprising a fuselage and a bracket mounted to the fuselage, wherein the bracket holds the drag reduction device on the fuselage.

9. The UAV of claim 1, further comprising a payload latch configured to secure a payload to the UAV in an external position.

10. The UAV of claim 1, further comprising a tether configured to lower the payload during delivery.

* * * * *